(12) United States Patent
Watanabe et al.

(10) Patent No.: US 11,808,931 B2
(45) Date of Patent: Nov. 7, 2023

(54) IMAGE PICKUP APPARATUS WITH ROTATION UNIT

(71) Applicant: Evident Corporation, Nagano (JP)

(72) Inventors: Satoshi Watanabe, Tokyo (JP);
Mayumi Odaira, Akiruno (JP)

(73) Assignee: Evident Corporation, Nagano (JP)

( * ) Notice: Subject to any disclaimer, the term of this patent is extended or adjusted under 35 U.S.C. 154(b) by 375 days.

(21) Appl. No.: 17/194,439

(22) Filed: Mar. 8, 2021

(65) Prior Publication Data

US 2021/0191096 A1    Jun. 24, 2021

Related U.S. Application Data

(63) Continuation of application No. PCT/JP2019/004235, filed on Feb. 6, 2019.

(51) Int. Cl.
*G02B 21/06* (2006.01)
*G01N 15/02* (2006.01)
(Continued)

(52) U.S. Cl.
CPC ......... *G02B 21/06* (2013.01); *G01N 15/0211* (2013.01); *G01N 21/6458* (2013.01);
(Continued)

(58) Field of Classification Search
CPC .... G02B 21/06; G02B 21/0032; G02B 21/26; G02B 21/00; G02B 21/0004;
(Continued)

(56) References Cited

U.S. PATENT DOCUMENTS 6,621,571 B1  9/2003 Maeda et al.
7,554,725 B2  6/2009 Stelzer et al.
(Continued)

FOREIGN PATENT DOCUMENTS

DE    19624421 A1 * 1/1997 ........ G01M 11/0285
JP    2001-194323 A    7/2001
(Continued)

OTHER PUBLICATIONS

International Preliminary Report on Patentability dated Aug. 19, 2021 and Written Opinion of the International Searching Authority dated May 7, 2019 received in PCT/JP2019/004235.
(Continued)

*Primary Examiner* — Arnel C Lavarias
(74) *Attorney, Agent, or Firm* — Scully, Scott, Murphy & Presser, P.C.

(57) ABSTRACT

An image pickup apparatus includes a signal acquisition unit and a rotation unit. The signal acquisition unit includes an illumination unit including a light source and configured to irradiate a sample with a light beam, a photodetector including a plurality of light-receiving portions two-dimensionally arranged, and a detection optical system configured to guide light having been irradiated from the illumination unit to the sample and passed through the sample, to the photodetector. The rotation unit rotates the sample and the signal acquisition unit relative to each other, about a first axis intersecting an optical axis of the detection optical system in the sample. The illumination unit irradiates the sample with light beams at two or more incident angles in a plane including the optical axis and the first axis.

19 Claims, 26 Drawing Sheets

(51) Int. Cl.
  *G01N 21/64* (2006.01)
  *G02B 21/00* (2006.01)
  *G02B 21/26* (2006.01)

(52) U.S. Cl.
  CPC . *G02B 21/0032* (2013.01); *G01N 2015/0222* (2013.01); *G02B 21/26* (2013.01)

(58) Field of Classification Search
  CPC .. G02B 21/0052; G02B 21/006; G02B 21/18; G02B 21/36; G02B 21/361; G02B 21/367; G01N 21/6458; G01N 15/0211; G01N 2015/0222; G01N 15/0205; G01N 15/0227; G01N 2015/0233
  USPC ....... 359/385, 362, 363, 368, 369, 370, 382, 359/384, 387, 388, 389, 390; 356/337, 356/338, 341, 450, 517
  See application file for complete search history.

(56) References Cited

U.S. PATENT DOCUMENTS

| | | | |
|---|---|---|---|
| 7,616,292 | B2 | 11/2009 | Kikuchi et al. |
| 8,350,230 | B2 | 1/2013 | Power et al. |
| 8,970,950 | B2 | 3/2015 | Stelzer |
| 9,599,960 | B2 | 3/2017 | Eguchi |
| 9,697,605 | B2 | 7/2017 | Lippert et al. |
| 9,823,455 | B2 | 11/2017 | Stelzer |
| 9,857,577 | B2 | 1/2018 | Stelzer et al. |
| 10,539,772 | B2 | 1/2020 | Keller et al. |
| 2006/0033987 | A1 | 2/2006 | Stelzer et al. |
| 2007/0109633 | A1 | 5/2007 | Stelzer |
| 2007/0247523 | A1 | 10/2007 | Kikuchi et al. |
| 2009/0225413 | A1 | 9/2009 | Stelzer et al. |
| 2010/0201784 | A1 | 8/2010 | Lippert et al. |
| 2010/0309548 | A1 | 12/2010 | Power et al. |
| 2011/0170182 | A1* | 7/2011 | Lippert .................. G02B 21/33 359/391 |
| 2013/0094755 | A1 | 4/2013 | Lippert et al. |
| 2014/0042339 | A1 | 2/2014 | Stelzer et al. |
| 2015/0098126 | A1 | 4/2015 | Keller et al. |
| 2015/0176966 | A1 | 6/2015 | Eguchi |
| 2015/0309294 | A1 | 10/2015 | Stelzer |
| 2017/0192896 | A1 | 7/2017 | Chilimbi et al. |
| 2018/0074305 | A1 | 3/2018 | Atzler et al. |
| 2018/0088304 | A1 | 3/2018 | Stelzer |
| 2018/0359404 | A1 | 12/2018 | Yonetani |
| 2019/0041198 | A1 | 2/2019 | Suzuki |

FOREIGN PATENT DOCUMENTS

| | | |
|---|---|---|
| JP | 2006-509246 A | 3/2006 |
| JP | 2007-183425 A | 7/2007 |
| JP | 2010-540994 A | 12/2010 |
| JP | 2010-540996 A | 12/2010 |
| JP | 2012-173725 A | 9/2012 |
| JP | 2012-220558 A | 11/2012 |
| JP | 2015-118290 A | 6/2015 |
| JP | 2018-185524 A | 11/2018 |
| JP | 2018-205596 A | 12/2018 |
| WO | WO 2017/175495 A1 | 10/2017 |

OTHER PUBLICATIONS

International Search Report and Written Opinion dated May 7, 2019 issued in PCT/JP2019/004235.

Habaza, M. et al., "Rapid 3D Refractive-Index Imaging of Live Cells in Suspension without Labeling Using Dielectrophoretic Cell Rotation", Advanced Science News (2017), 4, 1600205, pp. 1-9, cited in spec on p. 1.

* cited by examiner

IMAGE PICKUP APPARATUS WITH ROTATION UNIT

CROSS-REFERENCE TO RELATED APPLICATION

The present application is a continuation application of International Application No. PCT/JP2019/004235 filed on Feb. 6, 2019, the entire contents of which are incorporated herein by reference.

BACKGROUND

Technical Field

The present disclosure relates to an image pickup apparatus capable of isotropically acquiring spatial frequency information of a sample.

Description of the Related Art

An image pickup apparatus capable of acquiring spatial frequency information of a sample is disclosed in "Rapid 3D Refractive-Index Imaging of Live Cells in Suspension without Labeling Using Dielectrophoretic Cell Rotation", Adv. Sci. 2017, 4, 1600205.

In "Rapid 3D Refractive-Index Imaging of Live Cells in Suspension without Labeling Using Dielectrophoretic Cell Rotation", an image pickup apparatus includes a light source, a microscope objective lens, an imaging lens, and an image sensor. In this apparatus, a subject is rotated using two orthogonal axes as axes of rotation. The two axes of rotation are positioned in a plane orthogonal to an optical axis of the microscope objective lens.

It is possible to acquire spatial frequency information of a sample by rotating the sample about two axes. The acquisition of spatial frequency information will be described in detail later.

SUMMARY

An image pickup apparatus according to at least some embodiments of the present disclosure includes:
a signal acquisition unit and a rotation unit, wherein
the signal acquisition unit includes an illumination unit including a light source and configured to irradiate a sample with a light beam, a photodetector including a plurality of light-receiving portions two-dimensionally arranged, and a detection optical system configured to guide light having been irradiated from the illumination unit to the sample and passed through the sample, to the photodetector,
the rotation unit rotates the sample and the signal acquisition unit relative to each other, about a first axis intersecting an optical axis of the detection optical system in the sample, and
the illumination unit irradiates the sample with light beams at two or more incident angles, in a plane including the optical axis and the first axis.

DETAILED DESCRIPTION

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

An image pickup apparatus of the present embodiment includes a signal acquisition unit and a rotation unit. The signal acquisition unit includes an illumination unit including a light source and configured to irradiate a sample with a light beam, a photodetector including a plurality of light-receiving portions two-dimensionally arranged, and a detection optical system configured to guide light having been irradiated from the illumination unit to the sample and passed through the sample, to the photodetector. The rotation unit rotates the sample and the signal acquisition unit relative to each other, about a first axis intersecting an optical axis of the detection optical system in the sample. The illumination unit irradiates the sample with light beams at two or more incident angles in a plane including the optical axis and the first axis.

Figure 1:
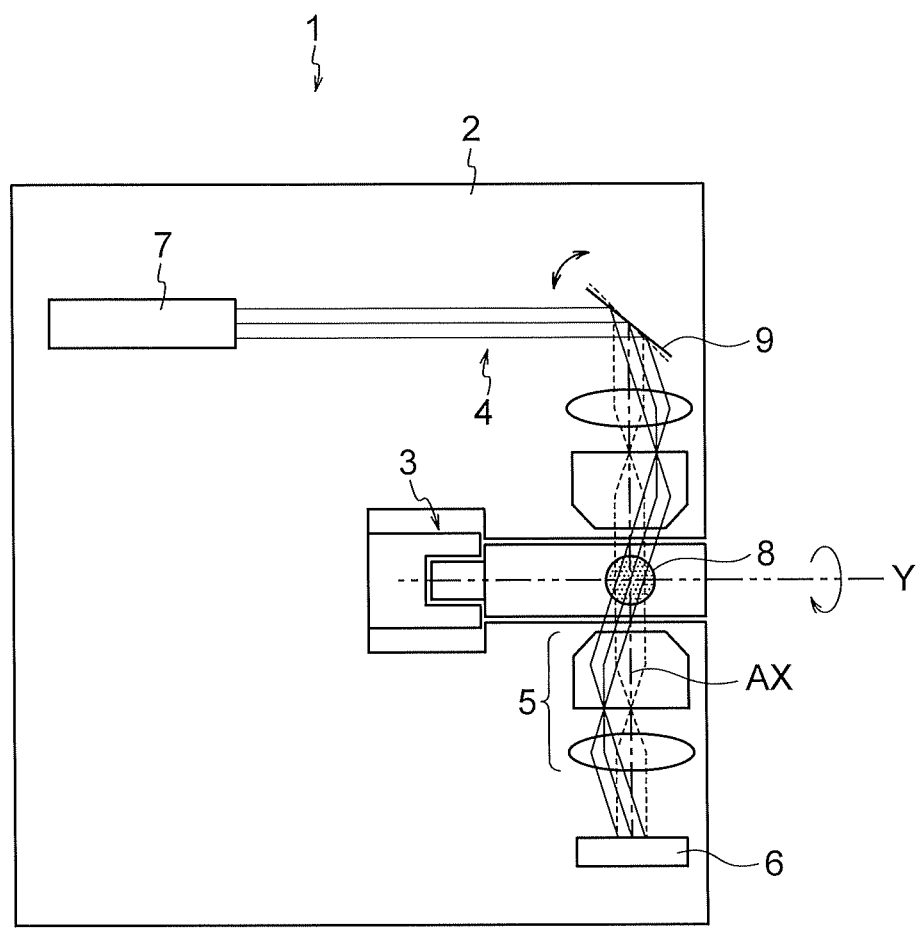
FIG. 1 is a diagram illustrating an image pickup apparatus of the present embodiment.

The image pickup apparatus of the present embodiment is illustrated in FIG. 1. In a description of the image pickup apparatus of the present embodiment, a plurality of diagrams including FIG. 1 are used. In each diagram, since the state of light rays is qualitatively drawn, the states of refraction of light rays and reflection of light rays are not always accurately drawn. An optical axis AX corresponds to the Z axis in an XYZ coordinate system.

An image pickup apparatus 1 includes a signal acquisition unit 2 and a rotation unit 3. The signal acquisition unit 2 includes an illumination unit 4, a detection optical system 5, and a photodetector 6. The rotation unit 3 will be described later.

The illumination unit 4 includes a light source 7 and irradiates a sample 8 with light. It is possible to use a light source that produces monochromatic light or a light source that produces quasi-monochromatic light for the light source 7. The illumination unit 4 includes a mirror 9. The mirror 9 will be described later.

The light source that produces monochromatic light is, for example, a laser. The light source that produces quasi-monochromatic light is, for example, a light-emitting diode (LED). It is possible to produce quasi-monochromatic light with a combination of a white light source and a narrow bandpass filter.

Light is irradiated from the illumination unit 4 to the sample 8. The detection optical system 5 guides light passed through the sample 8 to the photodetector 6.

The photodetector 6 includes a plurality of light-receiving portions two-dimensionally arranged. A CCD image sensor or a CMOS image sensor may be used for the photodetector 6. It is possible to use a Si sensor or an InGaAs sensor as the photodetector 6 in accordance with the wavelength of light emitted from the light source 7.

A parallel light beam or a substantially parallel light beam (hereinafter referred to as "parallel light beam") is emitted from the light source 7. The parallel light beam is incident on the mirror 9 and reflected by the mirror 9 toward the sample 8. The sample 8 is irradiated with the parallel light beam reflected by the mirror 9. As a result, the sample 8 is illuminated with the parallel light beam.

Light emerged from the sample 8 is incident on the detection optical system 5. Light emerged from the detection optical system 5 is incident on the photodetector 6.

In the image pickup apparatus 1, an optical path is formed from the light source 7 to the photodetector 6. If the number of optical paths is two, it is possible to obtain phase information directly from interference fringes. However, in the image pickup apparatus 1, since there is only one optical path, it is not possible to obtain phase information directly from interference fringes.

Therefore, in the image pickup apparatus 1, amplitude data of a wavefront is measured. The wavefront to be measured is a wavefront at a detection surface of the photodetector 6. In measurement of amplitude data of a wavefront, measurement with a plurality of wavelengths or measurement by changing the illumination angle may be performed. In the measurement by changing the illumination angle, the illumination angle is changed by a minute angle. By using these measurement methods, it is possible to measure a data set necessary for phase estimation of a wavefront at the detection surface.

Therefore, in the image pickup apparatus 1, a reference optical path is not necessary and thus an optical system can be more readily constructed.

Figure 2:
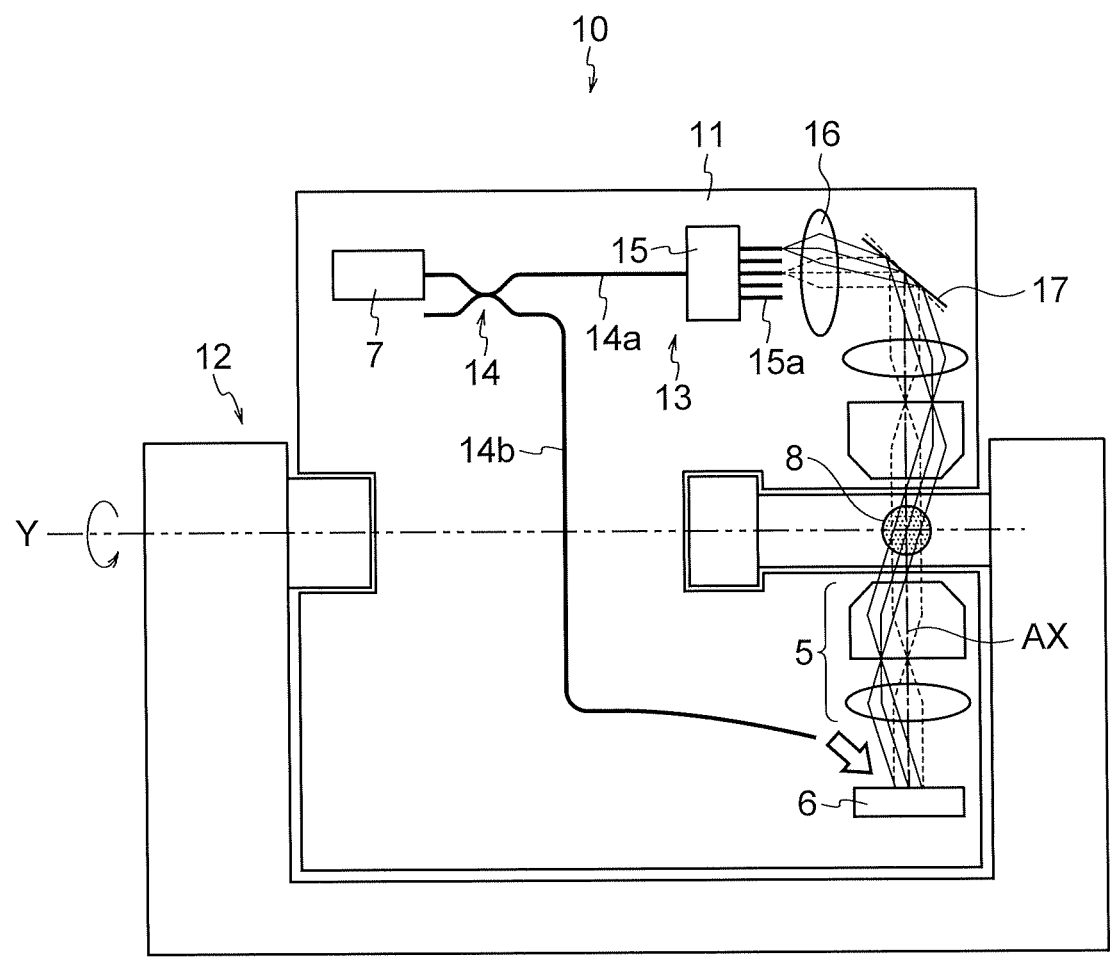
FIG. 2 is a diagram illustrating an image pickup apparatus of the present embodiment.

An image pickup apparatus of the present embodiment is illustrated in FIG. 2. The same configuration as that in FIG. 1 is denoted by the same numeral and a description thereof is omitted.

An image pickup apparatus 10 includes a signal acquisition unit 11 and a rotation unit 12. The signal acquisition unit 11 includes an illumination unit 13, the detection optical system 5, and the photodetector 6. The rotation unit 12 will be described later.

The illumination unit 13 includes a photocoupler 14, an optical switch 15, a lens 16, and a mirror 17. The optical switch 15 will be described later.

Light emitted from the light source 7 is incident on the photocoupler 14 through an optical system (not illustrated). The light incident on the photocoupler 14 is split into two light beams by the photocoupler 14. The two light beams are emerged individually from an optical fiber 14a and an optical fiber 14b.

The light emerged from the optical fiber 14a is incident on the lens 16 through the optical switch 15. A parallel light beam is emerged from the lens 16. The parallel light beam is incident on the mirror 17 and reflected by the mirror 17 toward the sample 8. The sample 8 is irradiated with the parallel light beam reflected by the mirror 17. As a result, the sample 8 is illuminated with the parallel light beam.

An output end of the optical fiber 14b is positioned in the vicinity of the photodetector 6. The light emerged from the optical fiber 14b is converted to a parallel light beam by an optical system (not illustrated) and thereafter incident on the photodetector 6.

An optical path is formed from the light source 7 to the photodetector 6 also in the image pickup apparatus 10. However, unlike the image pickup apparatus 1, the image pickup apparatus 10 has two optical paths. Accordingly, in the image pickup apparatus 10, it is possible to obtain phase information directly from interference fringes.

Light emitted from the light source 7 is emitted from the output end of the optical fiber 14b. That is, the light emitted from the optical fiber 14b does not pass through the sample 8. In the image pickup apparatus 10, a reference optical path is formed by the optical fiber 14b.

It is possible to measure a data set that enables reconstruction of a wavefront from the interference fringes detected by the photodetector 6. For the measurement of a data set, a phase shifting method or a Fourier fringe analysis method may be used.

The case of using interference fringes is described. In the following description, illumination light is referred to as measurement light. As described above, it is possible to detect interference fringes by the photodetector 6.

By analyzing the interference fringes, it is possible to acquire a scattering potential. For example, a refractive index is obtained from the scattering potential.

The acquisition of the scattering potential is described. A space in which a sample is disposed (hereinafter referred to as "real space") is a space in units of distance. The measurement light is a physical quantity in real space. The measurement light includes scattering light. Therefore, the scattering light is also a physical quantity in real space.

The real space is transformed by a Fourier transform into a space in units of frequency (hereinafter referred to as "frequency space"). The interference fringes can be considered as representation of information in frequency space. The interference fringes include information on physical quantity in real space, for example, information on scattering light. Scattering light in real space is represented by the scattering potential intersecting a spherical shell of the Ewald sphere in frequency space.

Figure 3A:
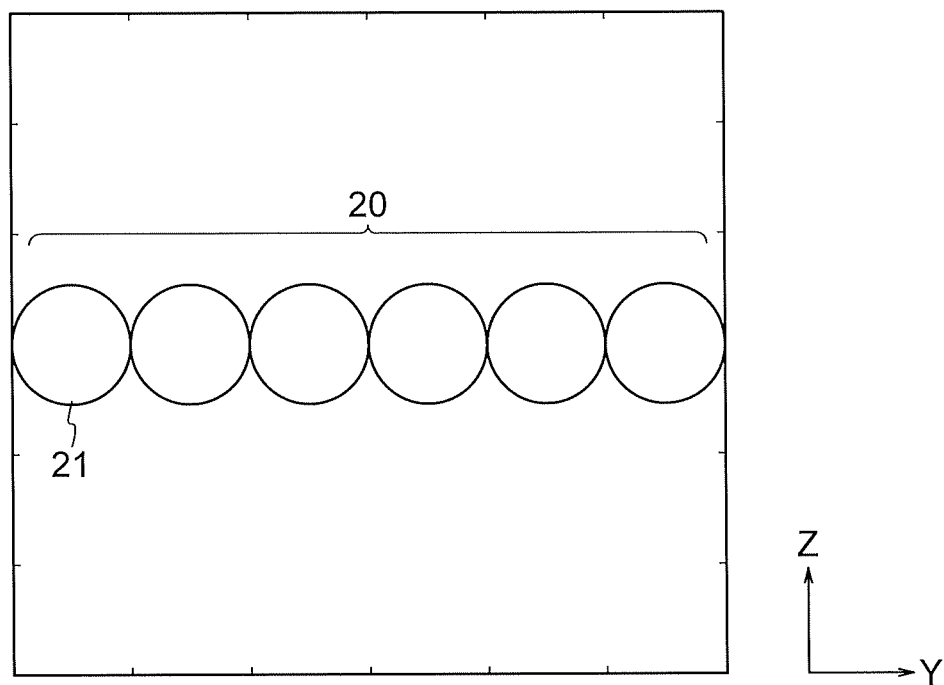
FIG. 3A and FIG. 3B are diagrams illustrating an example of a sample and an example of a scattering potential.
Figure 3B:
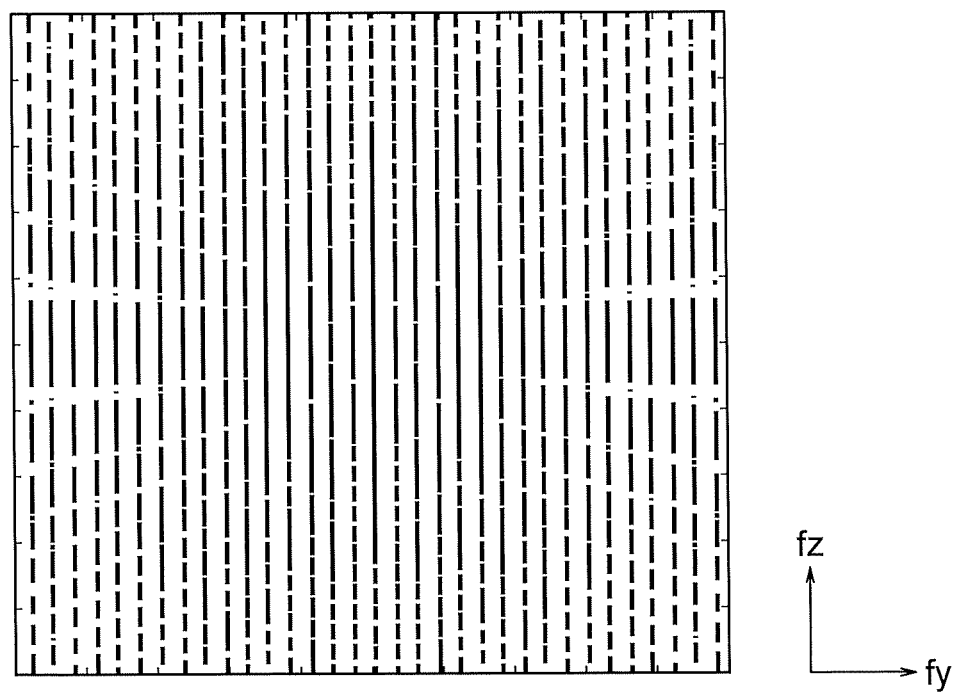

An example of the sample and an example of the scattering potential are illustrated in FIG. 3A and FIG. 3B. FIG. 3A is a diagram illustrating a sample, and FIG. 3B is a diagram illustrating the scattering potential.

A sample 20 has colorless transparent spheres 21. For example, the diameter of the sphere 21 is 10 µm, and the refractive index of the sphere 21 is 1.364. The surrounding of the sphere 21 is filled with a colorless transparent liquid. For example, the refractive index of the liquid is 1.334. Six spheres 21 are arranged in a row.

The scattering potential in real space is obtained from a refractive index distribution of the sample 20. By performing Fourier transform for this scattering potential, a scattering potential in frequency space can be obtained. Physical information of the sample 20, for example, the position, size, and refractive index all can be represented by numerical values. Thus, the scattering potential is obtained in a simulation. The scattering potential illustrated in FIG. 3B illustrates the result in a simulation.

The fy direction in frequency space corresponds to the y direction in real space. The fz direction in frequency space corresponds to the z direction in real space. As illustrated in FIG. 3B, the scattering potential in frequency space is distributed in the fy direction and the fz direction.

As described above, scattering light is produced in the sample 20. The direction in which scattering light is produced and the amplitude thereof depend on the irradiation angle of measurement light for the sample 20. Therefore, when the irradiation angle of measurement light is determined, only the scattering light having a specific amplitude for each direction is incident on the photodetector 6. That is, scattering light that can be detected is limited.

The scattering potential in frequency space corresponds to scattering light in real space. When scattering light that can be detected is limited, the scattering potential that can be acquired is also limited. In FIG. 3B, the scattering potential is distributed in the fy direction and the fz direction. However, the scattering potential that can be acquired is a part of this.

The scattering potential that can be acquired depends on the irradiation angle of measurement light. The irradiation angle of measurement light is represented by the direction connecting the center of the sphere shell of the Ewald sphere and the origin in frequency space.

Figure 4A:
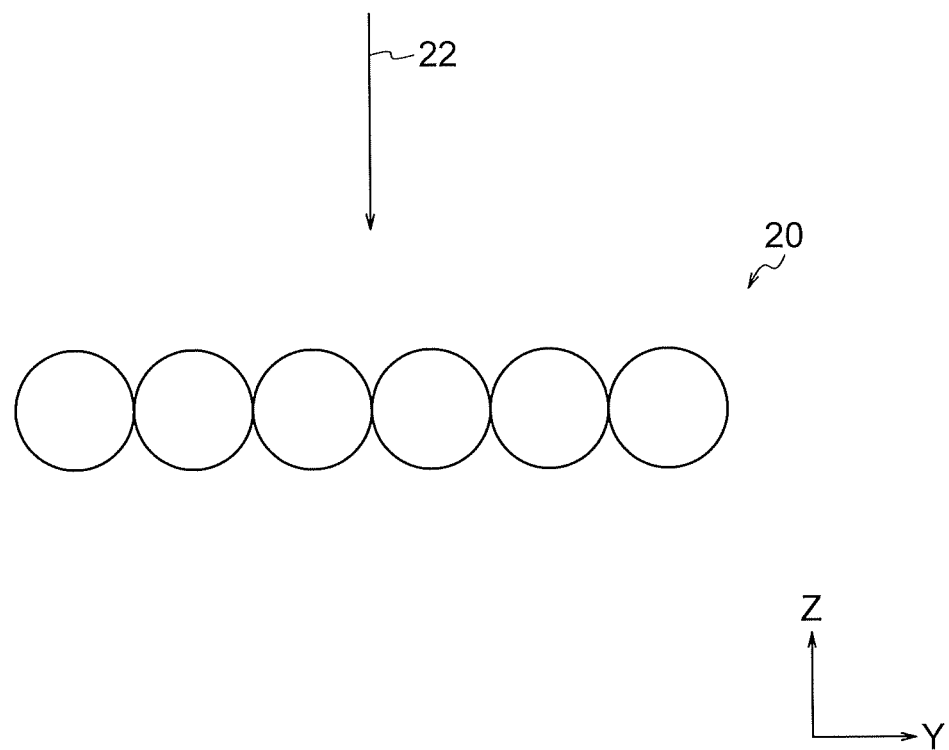
FIG. 4A and FIG. 4B are diagrams illustrating the relation between the direction of measurement light and the position of a spherical shell of the Ewald sphere.
Figure 4B:
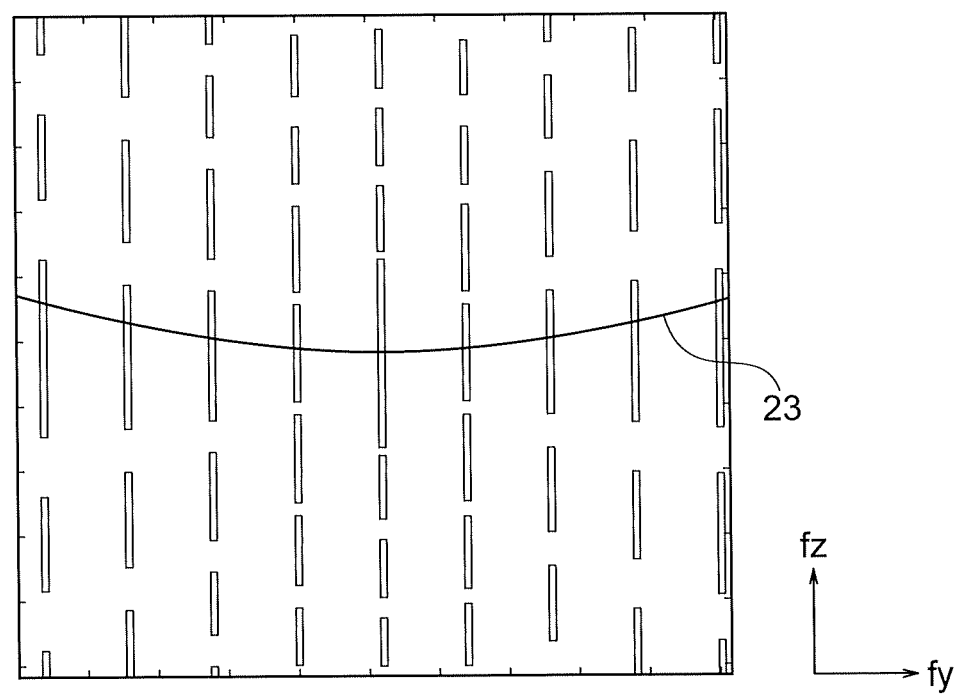

The relation between the direction of measurement light and the position of the spherical shell of the Ewald sphere is illustrated in FIG. 4A and FIG. 4B. FIG. 4A is a diagram illustrating the direction of measurement light, and FIG. 4B is a diagram illustrating the position of the spherical shell of the Ewald sphere. FIG. 4B is an enlarged view of the central portion of FIG. 3B.

In FIG. 4A, the sample 20 is vertically irradiated with measurement light 22. In this case, the position of the spherical shell of the Ewald sphere is as depicted by a curve 23 as illustrated in FIG. 4B.

In FIG. 4B, the curve 23 corresponds to the irradiation angle of the measurement light 22. Thus, only the scattering potential at a portion intersecting the curve 23 is the scattering potential that can be actually acquired.

As illustrated in FIG. 4B, the scattering potential is distributed in the fy direction and the fz direction. However, as illustrated in FIG. 4B, the scattering potential that can be actually acquired is limited to the scattering potential at a portion intersecting the curve 23. If the number of scattering potentials that can be acquired are few, it is difficult to calculate the refractive index at a high accuracy.

In order to increase the number of scattering potentials that can be acquired, the curve 23 may be moved. By moving the curve 23, it is possible to acquire the scattering potential after moving the curve 23 in addition to the scattering potential before moving the curve 23. As a result, it is possible to increase the number of scattering potentials that can be acquired.

The curve 23 depicts a cross section of the spherical shell of the Ewald sphere. Thus, it is possible to represent the movement of the curve 23 using the spherical shell of the Ewald sphere. A first method for moving the spherical shell of the Ewald sphere is described.

Figure 5A:
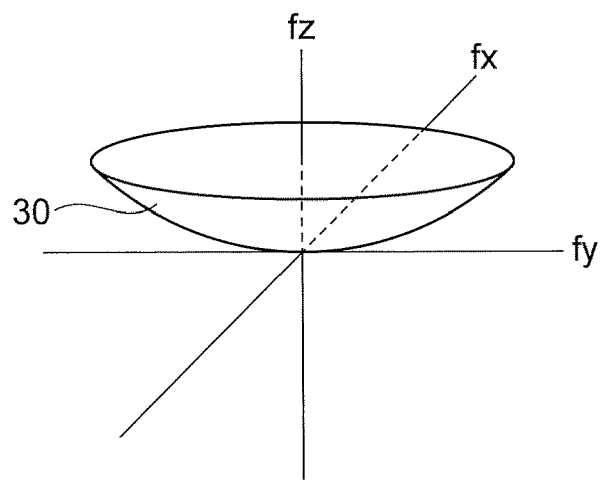
FIG. 5A, FIG. 5B, and FIG. 5C are diagrams illustrating movement of a spherical shell of the Ewald sphere according to a first method.
Figure 5B:
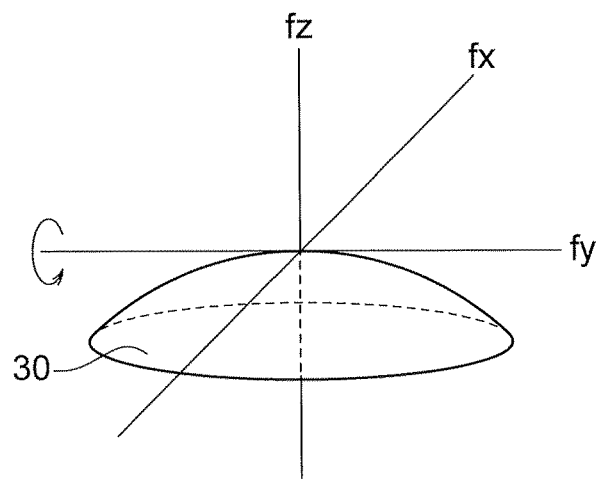
Figure 5C:
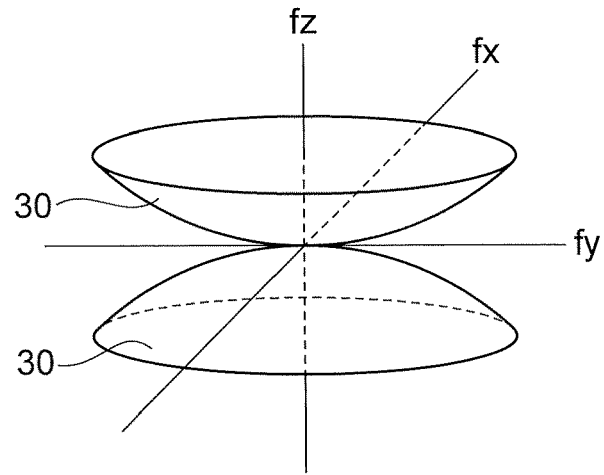

The movement of the spherical shell of the Ewald sphere according to the first method is illustrated in FIG. 5A, FIG. 5B, and FIG. 5C. FIG. 5A is a diagram illustrating a state before moving the spherical shell of the Ewald sphere, FIG. 5B is a diagram illustrating a state after moving the spherical shell of the Ewald sphere, and FIG. 5C is a diagram illustrating the two states superimposed on each other.

In the first method, a spherical shell 30 of the Ewald sphere (hereinafter referred to as "spherical shell 30") is rotated around the fy axis.

The angle of rotation before moving the spherical shell 30 is 0 degrees. For example, as illustrated in FIG. 5B, the spherical shell 30 is rotated from this state around the fy axis by 180 degrees. By doing so, as illustrated in FIG. 5C, two spherical shells 30 are obtained. As a result, the number of scattering potentials that can be acquired is doubled. Strictly speaking, it is possible to acquire the scattering potential at 0 degrees and the scattering potential at 180 degrees simultaneously in one measurement.

Here, the spherical shell 30 is rotated around the fy axis by 180 degrees. However, the angle by which the spherical shell 30 is rotated around the fy axis is not limited to 180 degrees. The spherical shell 30 may be moved by an angle smaller than 180 degrees. For example, the spherical shell 30 may be rotated around the fy axis by 90 degrees. By doing so, it is possible to further increase the number of scattering potentials that can be acquired.

Even in the image pickup apparatus of the present embodiment, it is possible to further increase the number of scattering potentials that can be acquired, if the spherical shell 30 can be rotated around the fy axis by 180 degrees.

The rotation unit 3 and the rotation unit 12 are described. In the rotation unit 3 and the rotation unit 12, relative rotation is performed around a first axis Y. The first axis Y is the axis intersecting the optical axis AX. The optical axis AX is, for example, the optical axis of the detection optical system 5.

The intersection of the first axis Y and the optical axis AX coincides with the focus position of the detection optical system 5. The relative rotation is performed in a state in which the sample 8 includes the focus position of the detection optical system 5 in its inside.

The image pickup apparatus 1 includes the rotation unit 3. It is possible to rotate the sample 8 and the signal acquisition unit 2 relative to each other by the rotation unit 3. In the image pickup apparatus 1, the signal acquisition unit 2 is fixed, and the sample 8 rotates around the first axis Y. By rotating the sample 8 and the signal acquisition unit 2 relative to each other, it is possible to rotate the spherical shell 30. Therefore, in the image pickup apparatus 1, it is possible to increase the number of scattering potentials that can be acquired.

The image pickup apparatus 10 includes the rotation unit 12. It is possible to rotate the sample 8 and the signal acquisition unit 11 relative to each other by the rotation unit 12. In the image pickup apparatus 10, the sample 8 is fixed, and the signal acquisition unit 11 rotates around the first axis Y. By rotating the sample 8 and the signal acquisition unit 11 relative to each other, it is possible to rotate the spherical shell 30. Therefore, in the image pickup apparatus 10, it is possible to increase the number of scattering potentials that can be acquired.

However, even when the sample 8 and the signal acquisition unit 2 are rotated relative to each other about the first axis Y, there still remains a region in which the scattering potential is unable to be acquired (hereinafter referred to as "missing region").

Figure 6A:
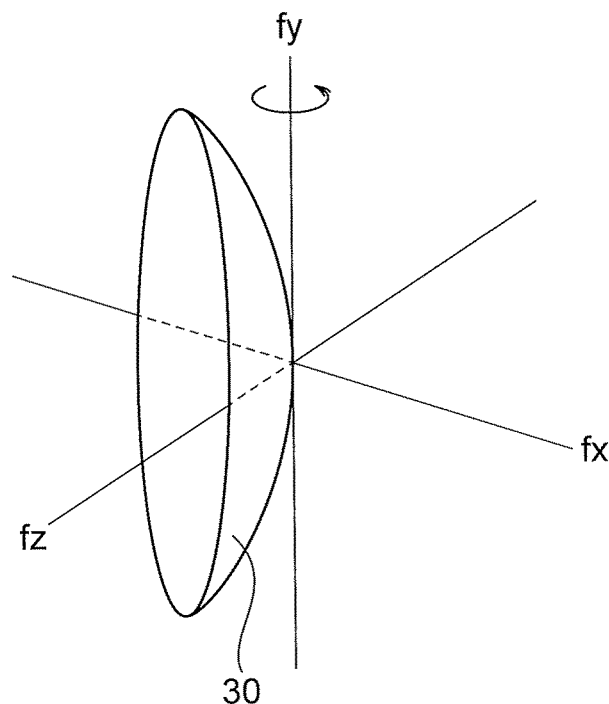
FIG. 6A and FIG. 6B are diagrams illustrating a missing region.
Figure 6B:
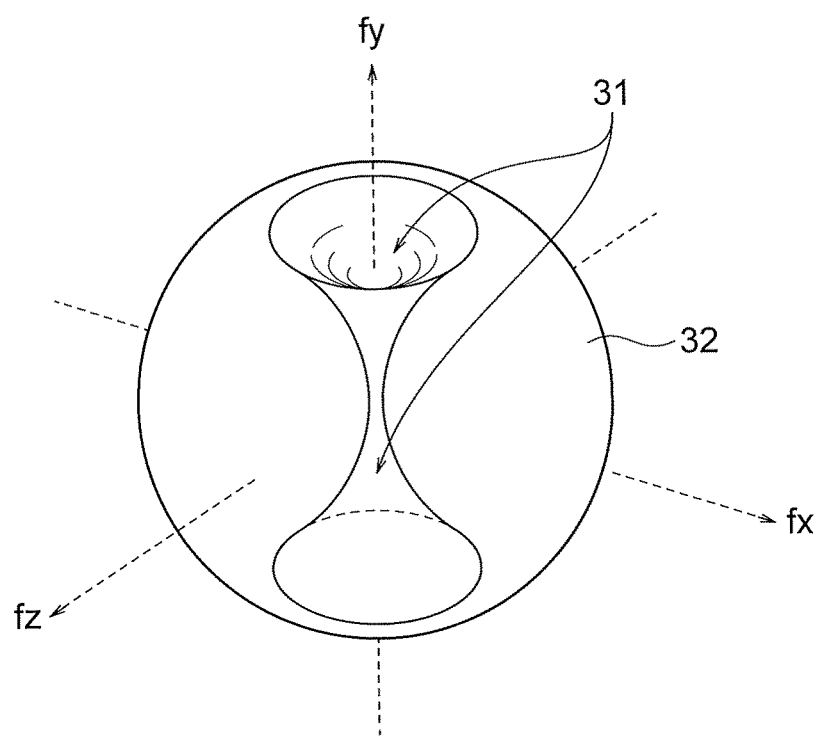

The missing region is illustrated in FIG. 6A and FIG. 6B. FIG. 6A is a diagram illustrating a state before rotating the spherical shell of the Ewald sphere one turn, and FIG. 6B is a diagram illustrating a state after rotating the spherical shell of the Ewald sphere one turn. The figure in FIG. 6A is a figure in which the figure in FIG. 5A is rotated by 90 degrees. Thus, a description of FIG. 6A is omitted.

When the spherical shell 30 is rotated one turn around the fy axis, as illustrated in FIG. 6B, a region 31 and a region 32 are formed. The region 31 is a missing region. The region 32 is a region in which the scattering potential can be acquired. The region 32 is a region excluding the region 31 from the sphere.

The region 31 has two regions each having a shape similar to a cone. In each region, a line corresponding to the generatrix of the cone is a curve.

If the region 31 can be reduced, it is possible to increase the number of scattering potentials that can be acquired. In order to reduce the region 31, the region 32 is further moved from the state illustrated in FIG. 6B. A second method for moving the spherical shell of the Ewald sphere is described.

Figure 7A:
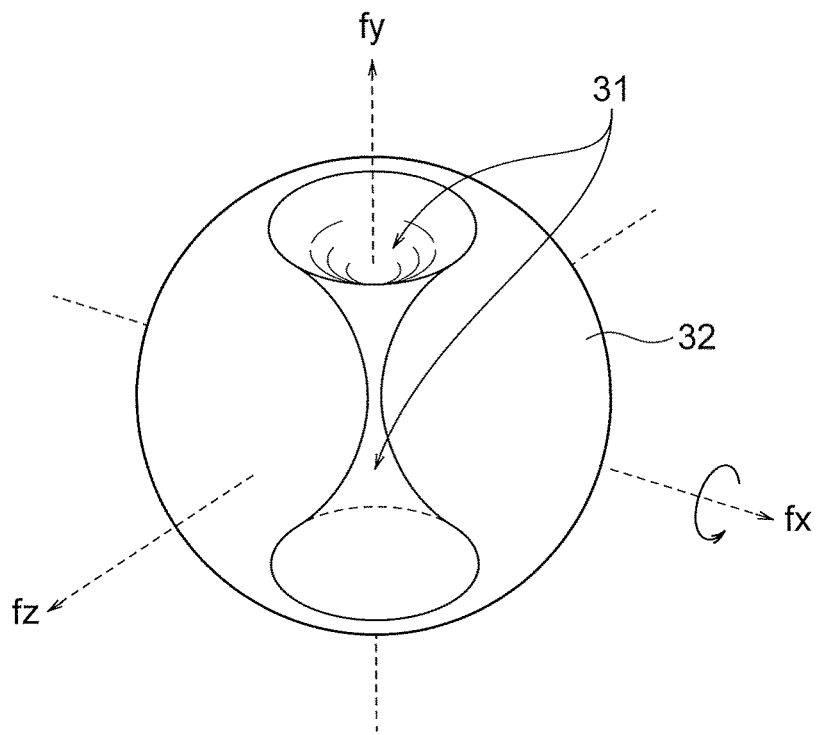
FIG. 7A and FIG. 7B are diagrams illustrating movement of a spherical shell of the Ewald sphere according to a second method.
Figure 7B:
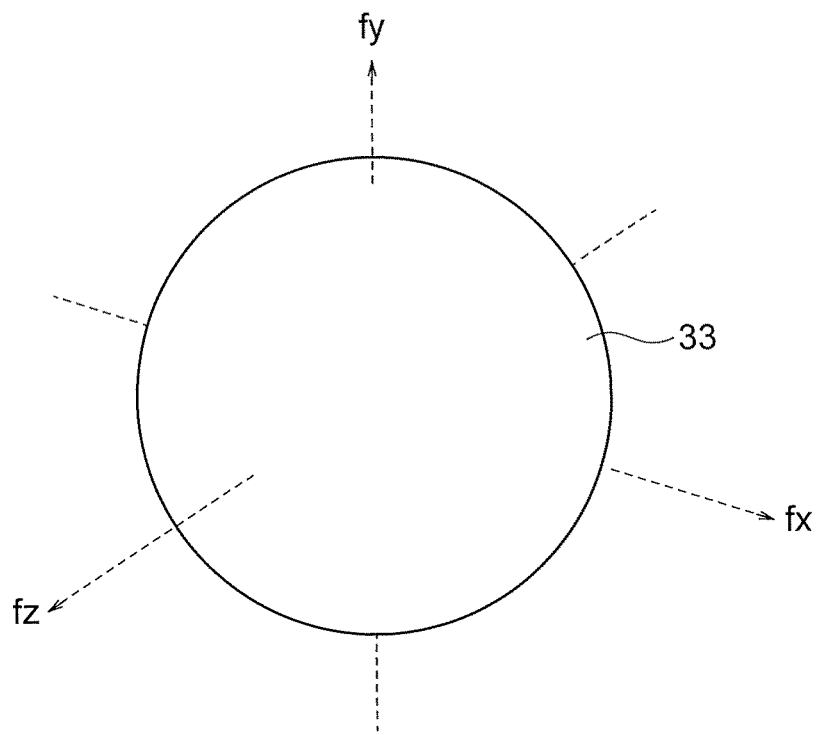

The movement of the spherical shell of the Ewald sphere according to the second method is illustrated in FIG. 7A and FIG. 7B. FIG. 7A is a diagram illustrating a state before rotating the spherical shell of the Ewald sphere one turn, and FIG. 7B is a diagram illustrating a state after rotating the spherical shell of the Ewald sphere one turn.

In the second method, as illustrated in FIG. 7A, the region 32 is rotated around the fx axis. By doing so, as illustrated in FIG. 7B, a spherical region 33 is formed. The region 32 is positioned at a place where the region 31 has been formed, whereby the region 33 is formed. Therefore, the region 31 disappears in the region 33. As just described, it is possible to eliminate a missing region by rotating the region 32 around the fx axis.

In order to rotate the region 32 around the fx axis, for example, it is conceivable that the sample 8 and the signal acquisition unit 2 are rotated relative to each other about a predetermined axis in the image pickup apparatus 1. The predetermined axis is an axis passing through the intersection of the first axis Y and the optical axis AX and orthogonal to a plane including the first axis Y and the optical axis AX.

However, in a method that is a combination of the first method and the second method, rotation occurs around two orthogonal axes. For example, in the image pickup apparatus 1, the sample 8 and the signal acquisition unit 2 are rotated around two orthogonal axes. Therefore, the apparatus is complicated and it also takes time to acquire information. Thus, it is not preferable to use the second method.

It is possible to move the position of the spherical shell 30, that is, the position of the curve 23 by a third method. The third method for moving the spherical shell of the Ewald sphere is described.

The position of the curve 23 changes according to the irradiation angle of measurement light. Thus, the curve 23 can be moved by changing the irradiation angle of measurement light.

Figure 8A:
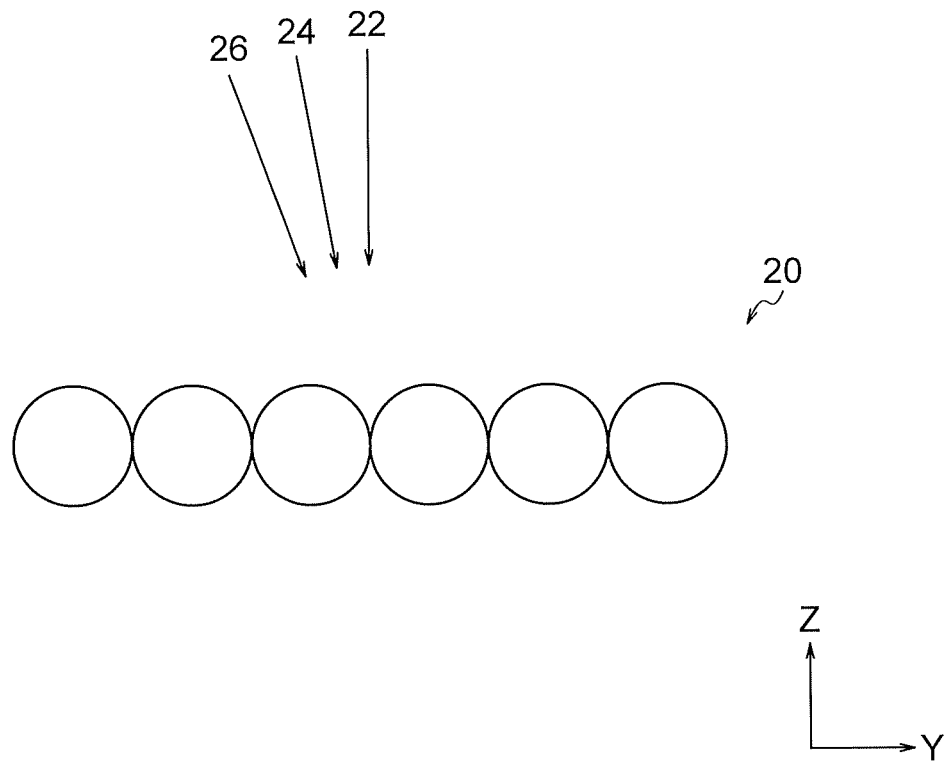
FIG. 8A and FIG. 8B are diagrams illustrating the relation between the direction of measurement light and the positions of spherical shells of the Ewald sphere.
Figure 8B:
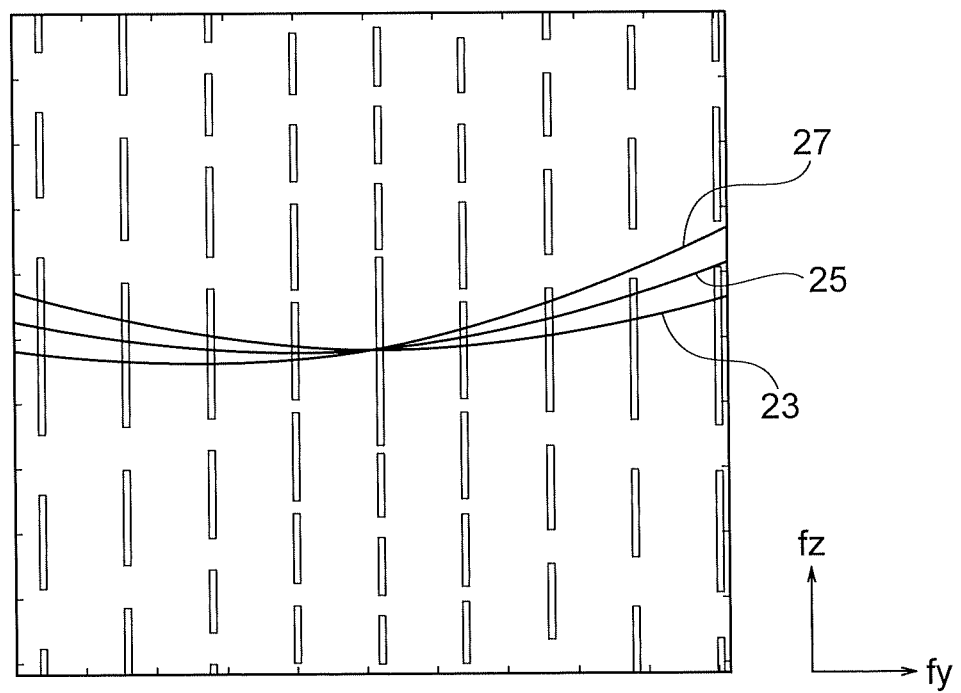

The relation between the direction of measurement light and the position of the spherical shell of the Ewald sphere is illustrated in FIG. 8A and FIG. 8B. FIG. 8A is a diagram illustrating the direction of measurement light, and FIG. 8B is a diagram illustrating the positions of the spherical shells of the Ewald spheres. A curve 23, a curve 25, and a curve 27 are curves each depicting the spherical shell of the Ewald sphere.

FIG. 8A illustrates a state in which the sample 20 is irradiated with measurement light from three directions. The measurement light 22 depicts measurement light emitted vertically to the sample 20. In this case, the curve 23 intersects the scattering potential.

Measurement light 24 depicts light irradiated obliquely to the sample 20. In this case, the curve 25 intersects the scattering potential. Measurement light 26 depicts light irradiated obliquely to the sample 20. The measurement light 26 is irradiated at an angle larger than the measurement light 24 is. In this case, the curve 27 intersects the scattering potential.

When the irradiation angle of measurement light is changed from the angle of the measurement light 22 to the angle of the measurement light 26, the spherical shell of the Ewald sphere changes from the position of the curve 23 to the position of the curve 27. The scattering potential that can be acquired varies with positions. Thus, it is possible to widen the acquisition range of the scattering potential by widening a variable range of the irradiation angle of measurement light.

As just described, compared with irradiation only with the measurement light 22 (hereinafter referred to as "unidirectional irradiation"), irradiation with the measurement light 22, the measurement light 24, and the measurement light 26 (hereinafter referred to as "multidirectional irradiation") can widen the acquisition range of the scattering potential.

In unidirectional irradiation, the sample is irradiated with illumination light from one direction. Thus, for example, irradiation only with the measurement light 24 and irradiation only with the measurement light 26 are also included in unidirectional irradiation.

In multidirectional irradiation, the sample is irradiated with illumination light from a plurality of directions. Thus, for example, irradiation only with the measurement light 22 and the measurement light 24 and irradiation only with the measurement light 24 and the measurement light 26 are also included in multidirectional irradiation.

Expansion of the range in which the scattering potential can be acquired means reduction of the missing region. It is possible to reduce the missing region by multidirectional irradiation. A case where a sample is irradiated with measurement light from two directions is described.

Figure 9:
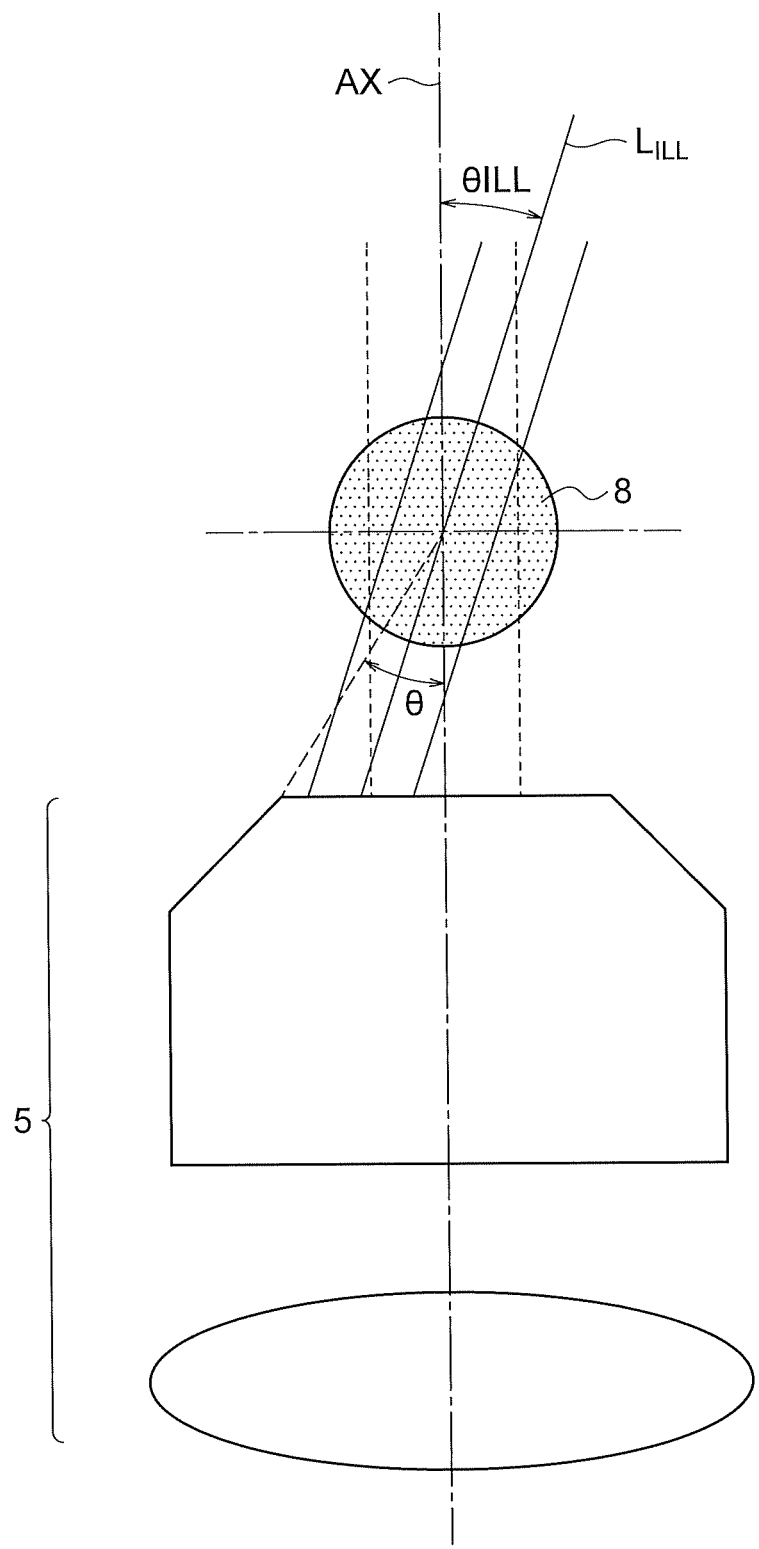
FIG. 9 is a diagram illustrating a state of measurement light incident on a sample.

A state of measurement light incident on the sample is illustrated in FIG. 9. As illustrated in FIG. 9, by performing multidirectional irradiation, the incident angle of measurement light on the sample 8 changes. Since measurement light is a parallel light beam, an incident angle θILL of measurement light on the sample 8 is the angle formed between a central ray of measurement light and the optical axis AX.

In measurement light depicted by solid lines, a central ray $L_{ILL}$ of measurement light intersects the optical axis AX. Therefore, θILL≠0°. In measurement light depicted by dotted lines, the central ray of measurement light coincides with the optical axis AX. Therefore, θILL=0°.

Figure 10A:
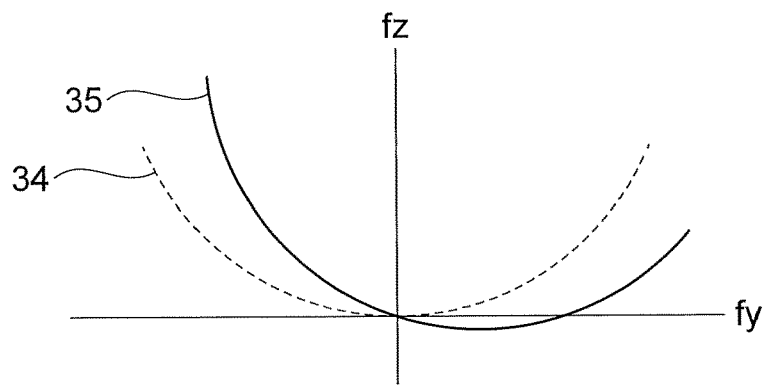
FIG. 10A, FIG. 10B, and FIG. 10C are diagrams illustrating a missing region.
Figure 10B:
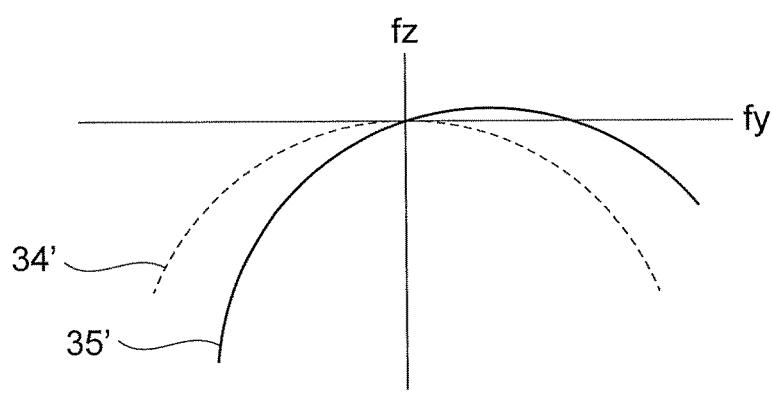
Figure 10C:
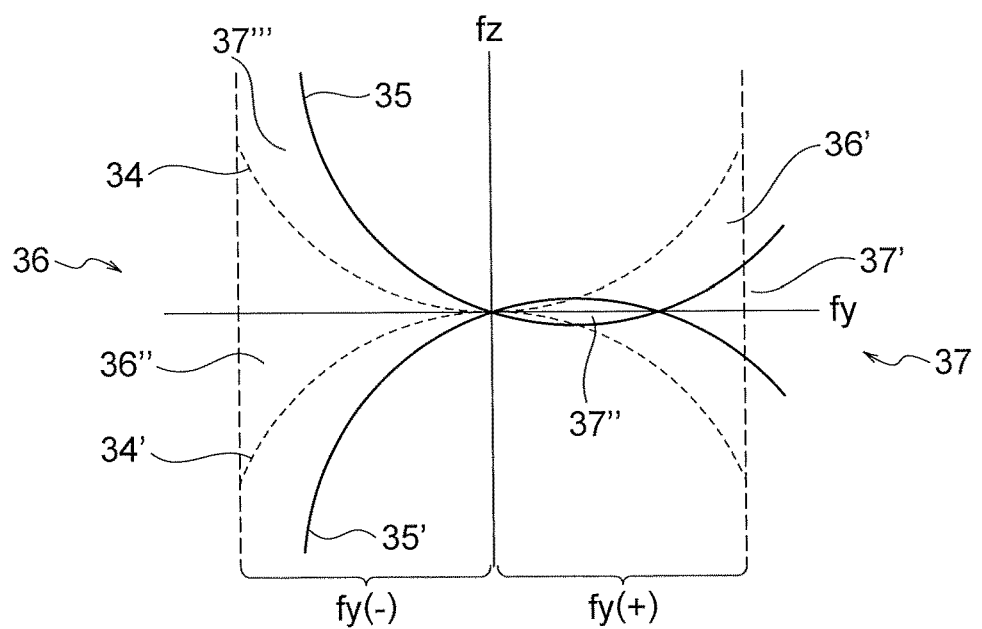

A state of the spherical shell of the Ewald sphere is illustrated in FIG. 10A, FIG. 10B, and FIG. 10O. FIG. 10A is a diagram illustrating a state before moving the spherical shell of the Ewald sphere, FIG. 10B is a diagram illustrating a state after moving the spherical shell of the Ewald sphere, and FIG. 10O is a diagram illustrating the two states superimposed on each other.

In FIG. 10A, a curve 34 and a curve 35 are curves each depicting the spherical shell of the Ewald sphere. The curve 34 is a curve when θILL=0°. The curve 35 is a curve when θILL=A° (where A≠0).

Measurement with θILL=0° and measurement with θILL=A° are not simultaneously performed. Therefore, the curve 34 and the curve 35 are not simultaneously generated. However, in data, as illustrated in FIG. 10A, it is possible to superimpose the curve 34 and the curve 35 on each other.

In FIG. 10B, a curve 34' and a curve 35' are curves each depicting the spherical shell of the Ewald sphere. The curve 34' is a curve when θILL=0°. The curve 35' is a curve when θILL=A° (where A≠0).

FIG. 10A illustrates a state before moving the spherical shell of the Ewald sphere, where the angle of rotation is 0 degrees. In FIG. 10B, the spherical shell of the Ewald sphere is rotated around the fy axis by 180 degrees.

In FIG. 10O, the missing region is illustrated. As described above, rotation of the spherical shell of the Ewald sphere is performed around the fy axis. Therefore, the missing region is formed along the fy axis. Then, an evaluation range in the fy direction of the missing region is set as an acquisition frequency range in the fy direction with θILL=0°.

As illustrated in FIG. 10O, a missing region 36 is formed between the curve 34 and the curve 34'. The missing region 36 includes a region 36' and a region 36". A missing region 37 is formed between the curve 35 and the curve 35'. The missing region 37 includes a region 37', a region 37", and a region 37'''.

In a range fy(+), the region 36' is formed between the curve 34 and the curve 34'. In a range fy(−), the region 36' is formed between the curve 34 and the curve 34'. When θILL=0°, the range of the missing region and the shape of the missing region are the same in the range fy(+) and the range fy(−).

In the range fy(+), the region 37' and the region 37" are formed between the curve 35 and the curve 35'. In the range fy(−), the region 37' ' is formed between the curve 35 and the curve 35'. When θILL=A°, the range of the missing region and the shape of the missing region are different in the range fy(+) and the range fy(−).

The missing region when measurement with θILL=0° and measurement with θILL=A° are performed is a region where the missing region when θILL=0° and the missing region when θILL=A° overlap each other.

In the range fy(+), the entire region 37' overlaps the region 36'. In the region 37", the curve 34 and the curve 34' are positioned inside the region. In a region surrounded by the curve 34 and the curve 35 and a region surrounded by the curve 34' and the curve 35', it is possible to acquire the scattering potential. As just described, in the region 37", a part of the region overlaps the region 36'. Thus, in the range fy(+), the region 37' and a part of the region 37" depict a missing region.

In the range fy(−), the entire region 36" overlaps the region 37'''. Thus, in the range fy(−), the region 36" depicts a missing region.

Figure 11A:
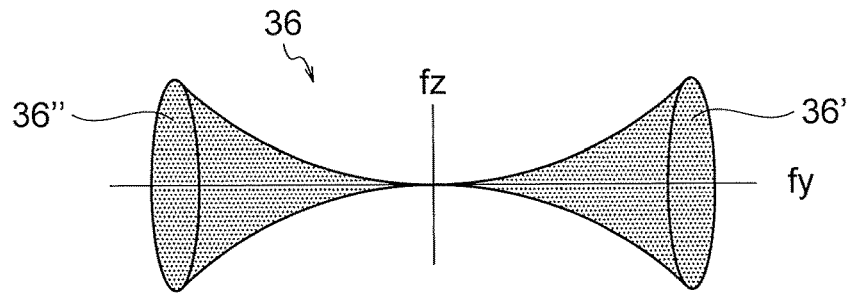
FIG. 11A, FIG. 11B, and FIG. 11C are diagrams illustrating a missing region.
Figure 11B:
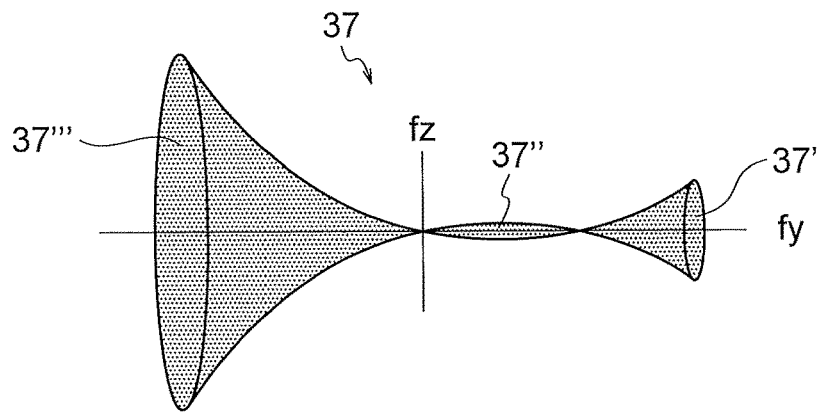
Figure 11C:
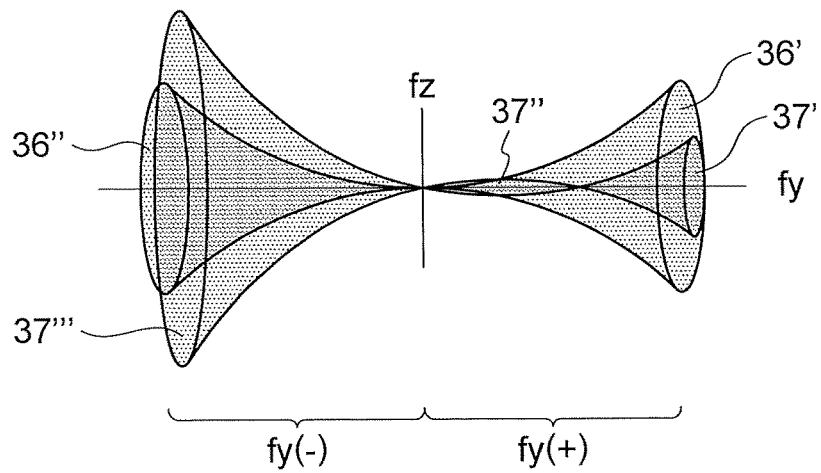

A state of the missing region is illustrated in FIG. 11A, FIG. 11B, and FIG. 11C. FIG. 11A is a diagram illustrating a missing region when θILL=0°, FIG. 11B is a diagram illustrating a missing region when θILL=A°, and FIG. 11C is a diagram illustrating a state in which the missing regions are superimposed on each other.

As illustrated in FIG. 11A, the missing region 36 is formed when the curve 34 illustrated in FIG. 10A is rotated one turn around the fy axis. The missing region 36 includes the region 36' and the region 36".

As illustrated in FIG. 11B, the missing region 37 is formed when the curve 35 illustrated in FIG. 10A is rotated one turn around the fy axis. The missing region 37 includes the region 37', the region 37", and the region 37'''.

FIG. 11C illustrates a state in which the missing region 36 and the missing region 37 are superimposed on each other. As illustrated in FIG. 11C, it is possible to reduce the missing region in the range fy(+) by irradiating the sample with measurement light with θILL=A°.

However, it is not possible to reduce the missing region in the range fy(−) even by irradiating the sample with measurement light with θILL=A°. In order to reduce the missing region in the range fy(−), the incident angle θILL is set to an angle different from A°, for example, to −A°.

Figure 12A:
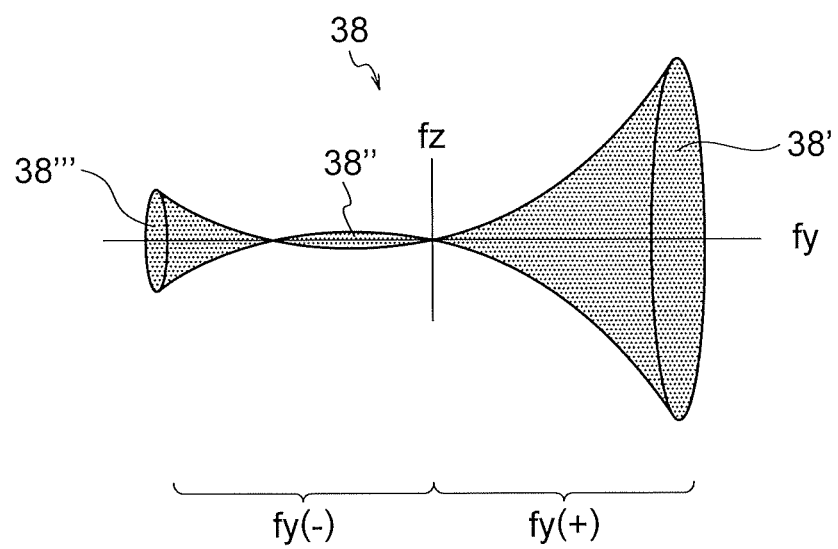
FIG. 12A and FIG. 12B are diagrams illustrating a missing region.
Figure 12B:
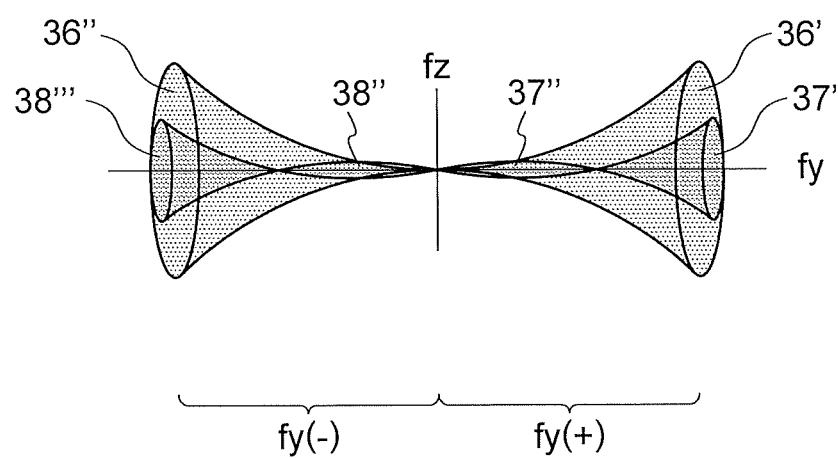

A state of the missing region is illustrated in FIG. 12A and FIG. 12B. FIG. 12A is a diagram illustrating a missing region when θILL=−A°, and FIG. 12B is a diagram illustrating a state in which the missing regions are superimposed on each other.

As illustrated in FIG. 12A, a missing region 38 is formed by irradiating the sample with measurement light with θILL=−A°. The missing region 38 includes a region 38', a region 38", and a region 38'''.

When rotated around the fz axis by 180 degrees, the missing region 38 coincides with the missing region 37 illustrated in FIG. 11B. Thus, the region 38' corresponds to the region 37' ", the region 38" corresponds to the region 37", and the region 38''' corresponds to the region 37'.

As described above, the entire region 37' overlaps the region 36'. Thus, the entire region 38''' overlaps the region 36". In the region 37", a part of the region overlaps the region 36'. Thus, in the region 38", a part of the region overlaps the region 36".

When measurement with θILL=0° and measurement with θILL=−A° are performed, in the range fy(−), a part of the region 38" and the region 38''' depict a missing region.

FIG. 12B illustrates a state in which the missing region 36, the missing region 37, and the missing region 38 are superimposed on each other. As illustrated in FIG. 12B, it is possible to reduce the missing region in the range fy(+) by irradiating the sample with measurement light with θILL=A°, and it is possible to reduce the missing region in the range fy(−) by irradiating the sample with measurement light with θILL=−A°.

If the missing region can be reduced, it is possible to isotropically acquire spatial frequency information of a sample.

The mirror 9 and the optical switch 15 are described.

The image pickup apparatus 1 includes the mirror 9. By moving the mirror 9, it is possible to set the irradiation angle of measurement light to two or more angles. The irradiation angle is an incident angle of measurement light on the sample 8. Thus, by moving the mirror 9, it is possible to set the incident angle of measurement light on the sample 8 to two or more angles. In this way, multidirectional irradiation is possible in the image pickup apparatus 1.

In the image pickup apparatus 1, the mirror 9 is moved by rotation. The axis of rotation of the mirror 9 is orthogonal to a plane including the optical axis AX and the first axis Y. Thus, it is possible to set the incident angle of measurement light on the sample 8 to two or more angles in the plane including the optical axis AX and the first axis Y.

The image pickup apparatus 10 includes the optical switch 15. Light emerged from the optical fiber 14a is incident on the optical switch 15. The optical switch 15 includes a plurality of optical fibers 15a on the output side. In the optical switch 15, light is emitted from any one optical fiber 15a among the optical fibers. By changing the optical fiber 15a that emits light, it is possible to set the incident angle of measurement light on the sample 8 to two or more angles. In this way, multidirectional irradiation is possible in the image pickup apparatus 10.

In the image pickup apparatus 10, a plurality of fibers are arranged in a row along an axis parallel to the optical axis AX. Thus, it is possible to set the incident angle of measurement light on the sample 8 to two or more angles in the plane including the optical axis AX and the first axis Y.

In multidirectional irradiation, it is desirable that the incident angle of measurement light can be changed to two or more angles. By doing so, it is possible to widen the acquisition range of the scattering potential.

In the image pickup apparatus 1, the orientation of the mirror 9 changes over time. In the image pickup apparatus 10, the optical fibers from which light is emerged are changed over time. Thus, the sample 8 is not irradiated simultaneously with a plurality of measurement light beams. That is, the sample 8 is irradiated with a plurality of measurement light beams separately in time.

As just described, in the image pickup apparatus 1 and the image pickup apparatus 10, illumination by multidirectional irradiation is conditional on illumination. Then, measurement in a plurality of rotation states is performed under this illumination condition.

As described above, in the image pickup apparatus 1, it is only necessary that the sample 8 rotates relative to the signal acquisition unit 2 about the first axis Y. In the image pickup apparatus 10, it is only necessary that the signal acquisition unit 11 rotates relative to the sample 8. That is, in the image pickup apparatus 1 and the image pickup apparatus 10, unlike the conventional method, rotation does not occur around two orthogonal axes. Therefore, in the image pickup apparatus 1 and the image pickup apparatus 10, it is possible to simplify the configuration of the apparatus.

Furthermore, in the image pickup apparatus 1, the angle of light emerged from the mirror 9 changes, whereby the position of the spherical shell of the Ewald sphere changes. In the image pickup apparatus 10, the optical fibers from which light is emerged are changed, whereby the position of the spherical shell of the Ewald sphere changes. Therefore, in the image pickup apparatus 1 and the image pickup apparatus 10, it is possible to diminish the missing region in the spatial frequency domain desired to be acquired. As a result, it is possible to isotropically acquire spatial frequency information of the sample 8.

Furthermore, by setting the incident angle of measurement light on the sample 8 to two or more angles, it is possible to complementarily reconstruct the spatial frequency of a sample. The complementary reconstruction of the spatial frequency of a sample means that the spatial frequencies of scattering potentials of the sample that are acquired independently from each other (hereinafter referred to as "measurement information") are synthesized. In this reconstruction, measurement information may be synthesized directly in a spatial frequency domain, or the spatial frequency of the sample may be estimated by repeatedly performing comparison between estimation of a wavefront in the photodetector and the measurement information such that the difference from pieces of measurement information is reduced.

As just described, in the image pickup apparatus 1 and the image pickup apparatus 10, it is possible to isotropically acquire spatial frequency information of a sample, with a simple configuration.

In the image pickup apparatus of the present embodiment, it is preferable that the illumination unit can change the incident angle to an angle that satisfies the following Conditional Expression (1):

$$0 < NAILL < NA \quad (1)$$

where

NA is an optical numerical aperture of the detection optical system, and

NAILL is a numerical aperture of light incident on the sample.

It is possible to determine the numerical aperture NAILL of light incident on the sample by NAILL=sin θILL. It is possible to determine the optical numerical aperture of the detection optical system 5 by NA=sin θ.

Figure 13A:
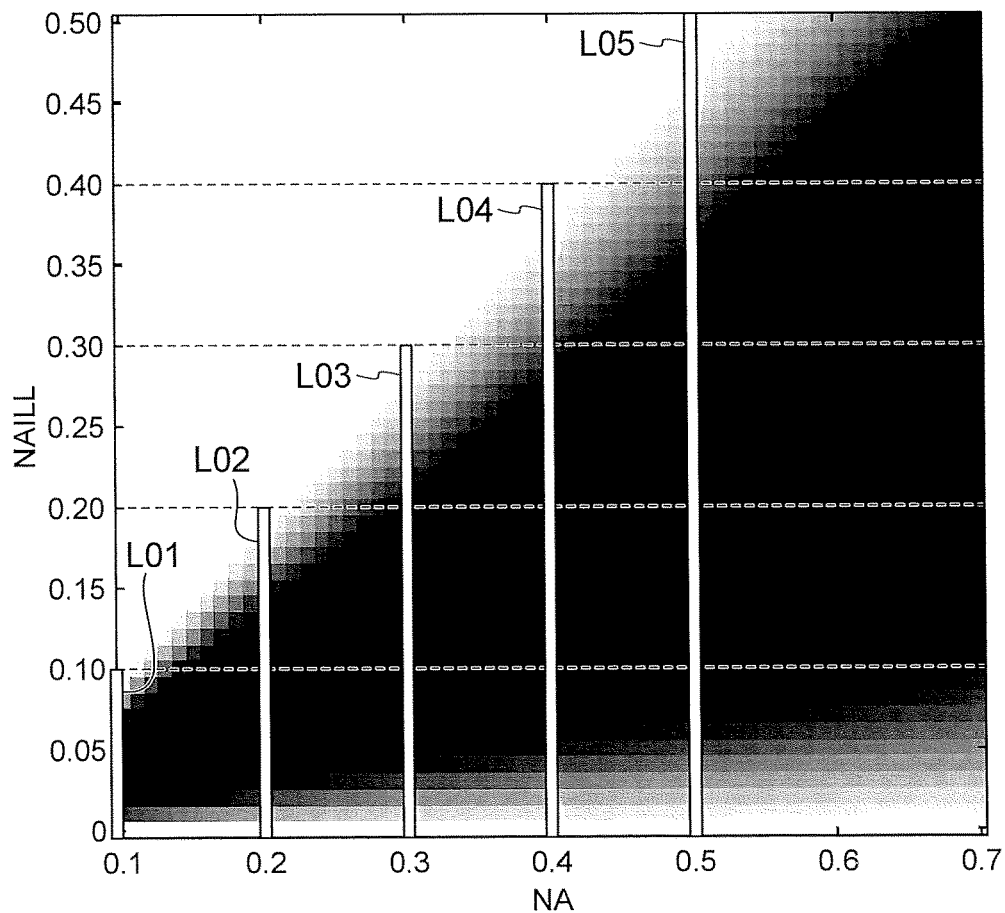
FIG. 13A and FIG. 13B are diagrams illustrating a ratio of the size of the missing region.
Figure 13B:
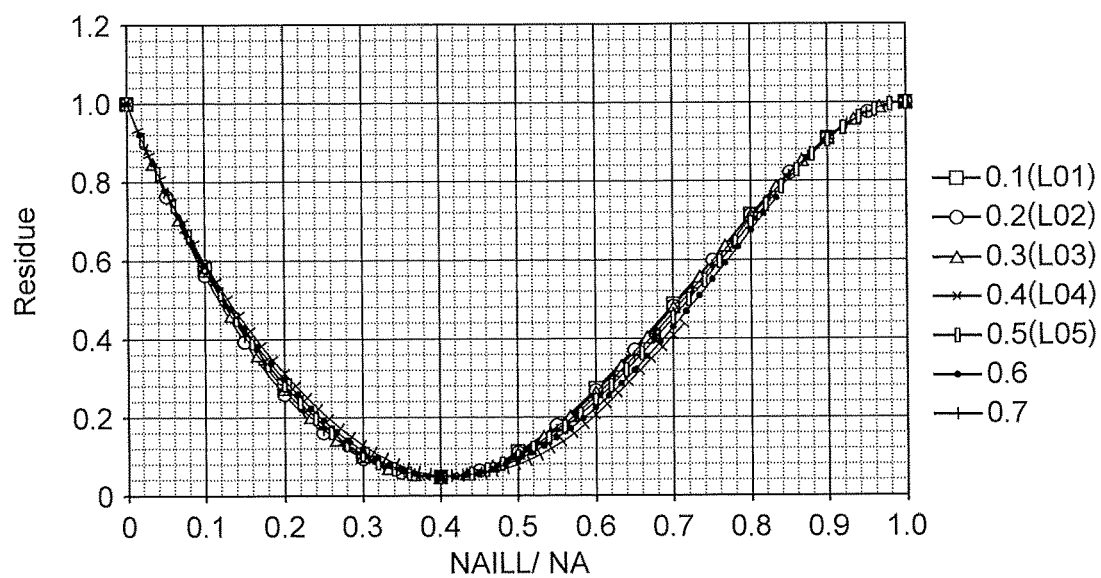

The ratio of the size of the missing region in multidirectional irradiation to the size of the missing region in unidirectional irradiation (hereinafter referred to as "the ratio of the size of the missing region") is illustrated in FIG. 13A and FIG. 13B. FIG. 13A is a diagram illustrating the ratio of the size of the missing region using NAILL and NA, and FIG. 13B is a diagram illustrating the ratio of the size of the missing region using NAILL/NA.

As described above, the following relation holds for θILL and θ. Thus, it is possible to describe the ratio of the size of the missing region using NAILL and NA. The parameter n is the refractive index of a medium.

$$NAILL = n \sin \theta ILL$$

$$NA = n \sin \theta$$

In FIG. 13A, NA is used for the horizontal axis, NAILL is used for the vertical axis, and the ratio of the size of the missing region is represented by brightness. The darker region has a smaller ratio of the size of the missing region.

In FIG. 13B, NAILL/NA is used for the horizontal axis, and the ratio of the size of the missing region is used for the vertical axis. Thus, the ratio of the size of the missing region is represented by a numerical value. Each curve depicts the ratio of the size of the missing region on a linear line illustrated in FIG. 13A.

For example, the change in ratio of the size of the missing region on a straight line L01 is depicted by a curve denoted by 0.1 (hereinafter referred to as "curve 01") in FIG. 13B. Change in brightness in the straight line L01 and change in numerical value in the curve 01 illustrate change in ratio of the size of the missing region when the numerical aperture of illumination light is changed from 0 to 0.1 in the detection optical system with a numerical aperture of 0.1.

A straight line L02 corresponds to a curve denoted by 0.2, a straight line L03 corresponds to a curve denoted by 0.3, a straight line L04 corresponds to a curve denoted by 0.4, and a straight line L05 corresponds to a curve denoted by 0.5. A straight line corresponding to a curve denoted by 0.6 and a straight line corresponding to a curve denoted by 0.7 are not illustrated in FIG. 13A.

As illustrated in FIG. 13A and FIG. 13B, the ratio of the size of the missing region changes between values of NAILL/NA of 0 and 1. When NAILL/NA=0, it is equivalent to unidirectional irradiation, and when NAILL/NA=1, the ratio of the size of the missing region is the same as that when NAILL/NA=0. This means that the effect of multidirectional irradiation is not produced when NAILL/NA=1.

Even when the value of the numerical aperture of the detection optical system varies, it is possible to reduce the ratio of the size of the missing region. The position at which the ratio of the size of the missing region is smallest does not depend on the value of numerical aperture of the detection optical system.

In the image pickup apparatus of the present embodiment, Conditional Expression (1) is satisfied. Therefore, it is possible to diminish the missing region. As a result, it is possible to isotropically acquire spatial frequency information of the sample 8.

In the image pickup apparatus of the present embodiment, it is preferable that the illumination unit change the incident angle to an angle that satisfies the following Conditional Expression (1').

$$0.13 \times NA0 < NAILL < 0.7 \times NA \quad (1')$$

By changing the incident angle to the angle that satisfies Conditional Expression (1'), it is possible to set the ratio of the size of the missing region to 50% or smaller.

In the image pickup apparatus of the present embodiment, it is preferable that the illumination unit include an illumination optical system configured to irradiate the sample with light and a first optical deflection element disposed at a position conjugate to an intersection of the optical axis and the first axis, and the incident angle be changed to two or more angles by the first optical deflection element.

Figure 14:
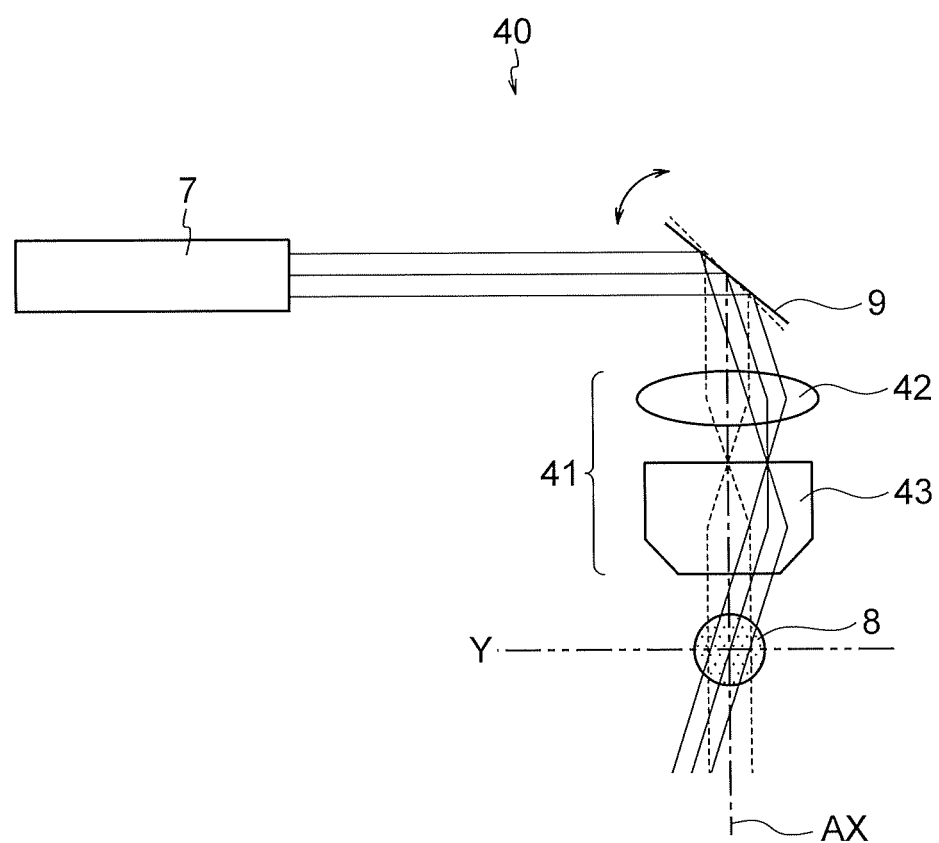
FIG. 14 is a diagram illustrating an illumination unit of the image pickup apparatus of the present embodiment.

An illumination unit of an image pickup apparatus of the present embodiment is illustrated in FIG. 14. The same configuration as that in FIG. 1 is denoted by the same numeral and a description thereof is omitted.

An illumination unit 40 includes the light source 7, the mirror 9, and an illumination optical system 41. The illumination optical system 41 includes a lens 42 and a lens 43.

The illumination unit 40 includes the first optical deflection element. It is possible to change the angle of the emerged light ray to two or more angles by the first optical deflection element. In the illumination unit 40, the angle of the emerged light ray is changed to two or more angles by the mirror 9. Thus, the mirror 9 is the first optical deflection element.

For example, it is possible to use a galvanometer scanner, a polygon scanner, or an acousto-optic deflector (AOD) as the optical deflection element.

The size of the galvanometer scanner and the size of the acousto-optic deflector is smaller than the size of the polygon scanner. Thus, it is possible to make the image pickup apparatus compact when the galvanometer scanner or the acousto-optic deflector is used.

In the galvanometer scanner, a large deflection angle can be obtained. However, it is difficult to deflect light at high speed. It is possible to achieve deflection of light not only by a mirror but by a half mirror.

In the polygon scanner, it is possible to obtain a large deflection angle and in addition, deflect light at high speed. In the acousto-optic deflector (AOD), it is possible to deflect light at high speed. However, the deflection angle is small.

It is preferable that the sample 8 be illuminated with a parallel light beam. In the illumination unit 40, the parallel light beam is incident on the mirror 9. Therefore, the mirror 9 is disposed at a position conjugate to the intersection of the optical axis AX and the first axis Y. As a result, it is possible to illuminate the sample 8 with the parallel light beam.

In addition, by deflecting the mirror 9, it is possible to change the incident angle of measurement light on the sample 8 and irradiate the sample 8 with measurement light.

It is preferable that the image pickup apparatus of the present embodiment further include a first beam splitter, a second optical deflection element, and a second beam splitter, and a measurement optical path passing through the sample and a reference optical path be positioned between the light source and the photodetector. The first beam splitter and the second beam splitter each have an optical surface having an optical film. In the first beam splitter, light transmitted in a first direction and light reflected in a second direction is generated from incident light by the optical film. The measurement optical path is positioned in the first direction and the reference optical path is positioned in the second direction, or the reference optical path is positioned in the first direction and the measurement optical path is positioned in the second direction. The first optical deflection element is disposed on the measurement optical path, the second optical deflection element is disposed on the reference optical path, and an incident light ray is deflected and emerged. The second beam splitter is disposed at an intersection of the measurement optical path deflected by the first optical deflection element and the reference optical path deflected by the second optical deflection element. A light ray on the measurement optical path reflected by the second beam splitter and a light ray on the reference optical path transmitted through the second beam splitter is incident on the photodetector.

Figure 15:
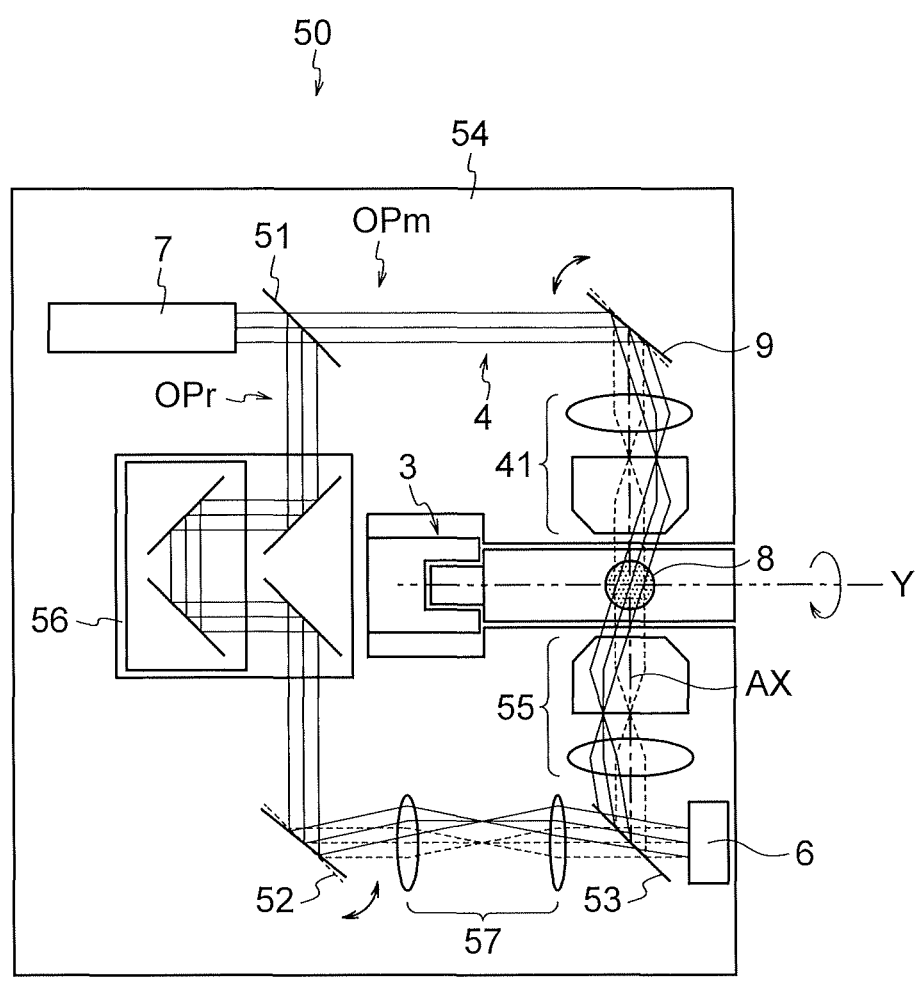
FIG. 15 is a diagram illustrating an image pickup apparatus of the present embodiment.

An image pickup apparatus of the present embodiment is illustrated in FIG. 15. The same configuration as that in FIG. 1 and FIG. 14 is denoted by the same numeral and a description thereof is omitted.

An image pickup apparatus 50 includes a beam splitter 51, a mirror 52, and a beam splitter 53. The beam splitter 51, the mirror 52, and the beam splitter 53 are disposed, for example, in a signal acquisition unit 54.

A measurement optical path OPm passing through the sample 8 and a reference optical path OPr are positioned between the light source 7 and the photodetector 6.

In the measurement optical path OPm, the illumination unit 4 and a detection optical system 55 are disposed. In the reference optical path OPr, an optical path length adjustor 56, the mirror 52, and an optical system 57 are disposed. The optical path length adjustor 56 and the optical system 57 are disposed if necessary.

The beam splitter 51 has an optical surface having an optical film. In the beam splitter 51, light transmitted in a first direction and light reflected in a second direction are generated from incident light by the optical film. Thus, the beam splitter 51 is the first beam splitter.

In the image pickup apparatus 50, the measurement optical path OPm is positioned in the first direction, and the reference optical path OPr is positioned in the second direction. However, the reference optical path OPr may be positioned in the first direction, and the measurement optical path OPm may be positioned in the second direction.

As described above, the mirror 9 is the first optical deflection element. Thus, the first optical deflection element is disposed on the measurement optical path OPm. The mirror 52 is disposed on the reference optical path OPr and deflects an incident light ray and the deflected light ray is emerged. Thus, the mirror 52 is the second optical deflection element.

The beam splitter 53 has an optical surface having an optical film. The beam splitter 53 is disposed at the intersection of the measurement optical path OPm deflected by the mirror 9 and the reference optical path OPr deflected by the mirror 52. Thus, the beam splitter 53 is the second beam splitter.

The optical path length adjustor 56 is disposed between the beam splitter 51 and the mirror 52. The optical path length adjustor 56 includes, for example, a piezo stage and four mirrors. Two mirrors are placed on the piezo stage. By moving the two mirrors, it is possible to change the optical path length in the reference optical path OPr.

The optical system 57 is disposed between the mirror 52 and the beam splitter 53. By disposing the optical system 57, it is possible to overlap a light ray incident on the photodetector 6 from the reference optical path OPr on a light ray incident on the photodetector 6 from the measurement optical path OPm.

In the image pickup apparatus 50, a light ray on the measurement optical path OPm reflected by the beam splitter 53 and a light ray on the reference optical path OPr transmitted through the beam splitter 53 are incident on the photodetector 6. Thus, in the image pickup apparatus 50, it is possible to obtain interference fringes. It is possible to measure a data set that enables reconstruction of a wavefront from the interference fringes detected by the photodetector 6.

In the image pickup apparatus 50, the signal acquisition unit 54 is fixed, and the sample 8 rotates around the first axis Y. Furthermore, multidirectional irradiation can be performed by moving the mirror 9. In this way, in the image pickup apparatus 50, it is possible to isotropically acquire spatial frequency information of a sample, with a simple configuration.

Figure 16:
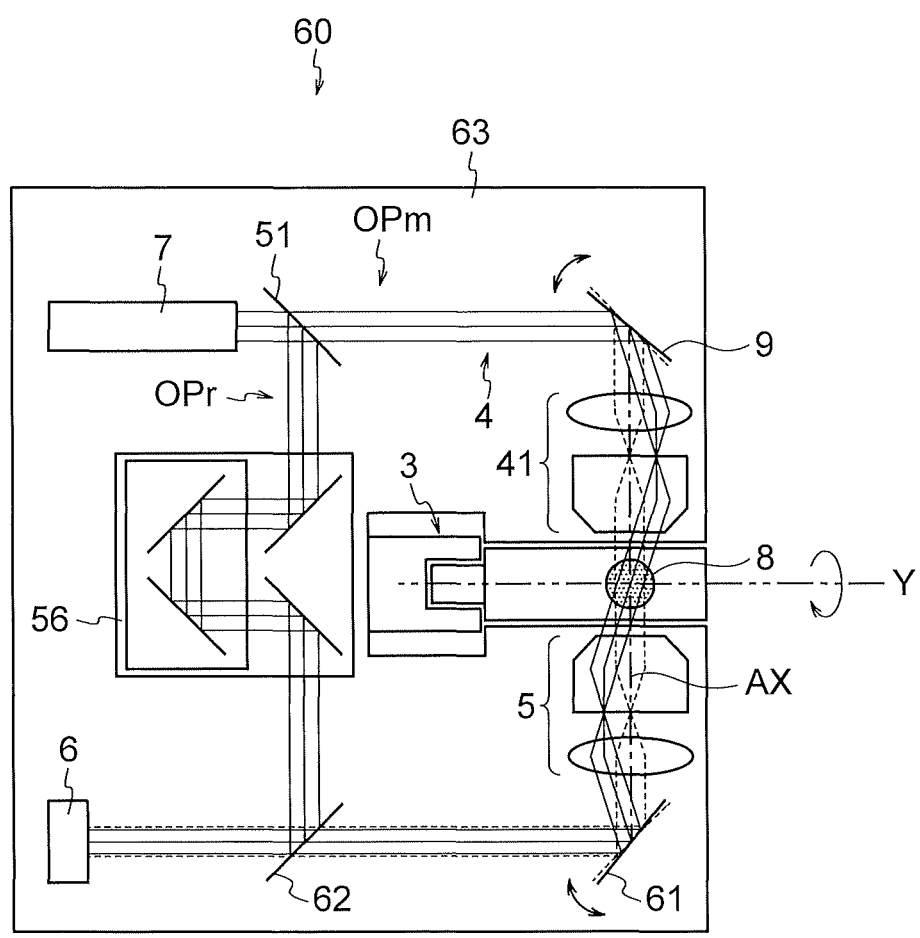
FIG. 16 is a diagram illustrating an image pickup apparatus of the present embodiment.

An image pickup apparatus of the present embodiment is illustrated in FIG. 16. The same configuration as that in FIG. 1 and FIG. 15 is denoted by the same numeral and a description thereof is omitted.

An image pickup apparatus 60 includes the beam splitter 51, a mirror 61, and a beam splitter 62. The beam splitter 51, the mirror 61, and the beam splitter 62 are disposed, for example, in a signal acquisition unit 63.

On the measurement optical path OPm, the illumination unit 4, the detection optical system 5, and the mirror 61 are disposed. On the reference optical path OPr, the optical path length adjustor 56 is disposed. The optical path length adjustor 56 is disposed if necessary.

The mirror 61 deflects an incident light ray and the deflected light ray is emerged. Thus, the mirror 61 is an optical deflection element. As described above, the mirror 9 is the first optical deflection element. In the image pickup apparatus 60, the two optical deflection elements are disposed on the measurement optical path OPm.

Since light is deflected by the mirror 9, light incident on the mirror 61 moves. The mirror 61 is an optical deflection element as described above and therefore, it is possible to change a deflection angle and a deflection direction. By appropriately setting the deflection angle and the deflection direction in the mirror 61, it is possible to cancel the deflection of light caused by the mirror 9 with the deflection by the mirror 61. Thus, in the image pickup apparatus 60, a light ray emerged from the mirror 61 does not move.

The beam splitter 62 has an optical surface having an optical film. The beam splitter 62 is disposed at the intersection of the measurement optical path OPm and the reference optical path OPr.

In the image pickup apparatus 60, a light ray on the measurement optical path OPm transmitted through the beam splitter 62 and a light ray on the reference optical path OPr reflected by the beam splitter 62 are incident on the photodetector 6. Thus, in the image pickup apparatus 60, it is possible to obtain interference fringes. It is possible to measure a data set that enables reconstruction of a wavefront from the interference fringes detected by the photodetector 6.

In the image pickup apparatus 60, the signal acquisition unit 63 is fixed, and the sample 8 rotates around the first axis Y. Furthermore, multidirectional irradiation can be performed by moving the mirror 9. In this way, in the image pickup apparatus 60, it is possible to isotropically acquire spatial frequency information of a sample, with a simple configuration.

In the image pickup apparatus of the present embodiment, it is preferable that the illumination unit include an illumination optical system configured to irradiate the sample with light and the illumination unit include a plurality of light-emerging portions arranged in an array and capable of being independently controlled. The light-emerging portions is disposed at a position conjugate to the intersection of the optical axis and the first axis. The illumination unit change the incident angle to two or more angles by performing control of changing the light-emerging portion from which light is emerged among the light-emerging portions.

Figure 17:
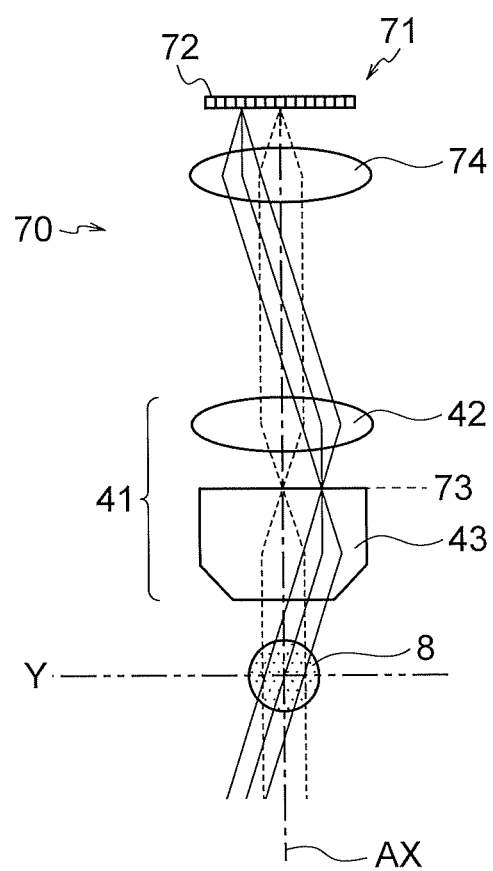
FIG. 17 is a diagram illustrating an illumination unit of the image pickup apparatus of the present embodiment.

The illumination unit of the image pickup apparatus of the present embodiment is illustrated in FIG. 17. The same configuration as that in FIG. 14 is denoted by the same numeral and a description thereof is omitted.

An illumination unit 70 includes a light source 71 and the illumination optical system 41 that irradiates the sample 8 with light. The illumination unit 70 includes a plurality of light-emerging portions 72. In the light-emerging portion 72, it is possible to dispose a light source itself, for example, a light-emitting diode (LED) or a semiconductor laser (LD).

The light-emerging portions 72 are arranged in an array. When a light source itself is disposed in the light-emerging portion 72, it is possible to control light emitting condition and non-emitting condition independently in the light-emerging portions 72.

It is preferable that the sample 8 be illuminated with the parallel light beam. In the illumination unit 70, the area of the light-emerging portions 72 is small to a degree that can be considered as a point light source. Therefore, the light-emerging portions 72 are disposed at a position conjugate to a pupil position 73 of the illumination optical system.

The illumination unit 70 includes a lens 74. The lens 74 is disposed between the light source 71 and the lens 42. With the lens 74 and the lens 42, it is possible to conjugate the position of the light source 71 and the position of the pupil position 73. When it is possible to ensure a sufficient space in the surrounding of the pupil position 73, the light-emerging portions 72 may be disposed at the pupil position 73.

In the illumination unit 70, the light source 71 is controlled. In this control, among the light-emerging portions 72, the light-emerging portion 72 from which light is emitted is changed. Multidirectional irradiation can be performed with this control.

Instead of using the light source 71, it is possible to use the light source 7, the photocoupler 14, and the optical switch 15 as illustrated in FIG. 2. In this case, an output end surface of the optical fiber 15a is located at the position of the light-emerging portion 72. Light emission does not occur at the output end surface of the optical fiber 15a. However, the function is the same as when a light source itself is disposed at the light-emerging portion 72, in that light is emitted. Thus, it is possible to consider the output end surface of the optical fiber 15a as the light-emerging portion 72.

It is preferable that the image pickup apparatus of the present embodiment include a sample holder configured to hold the sample, and the rotation unit fix the signal acquisition unit and rotate the sample holder relative to the signal acquisition unit.

Figure 18:
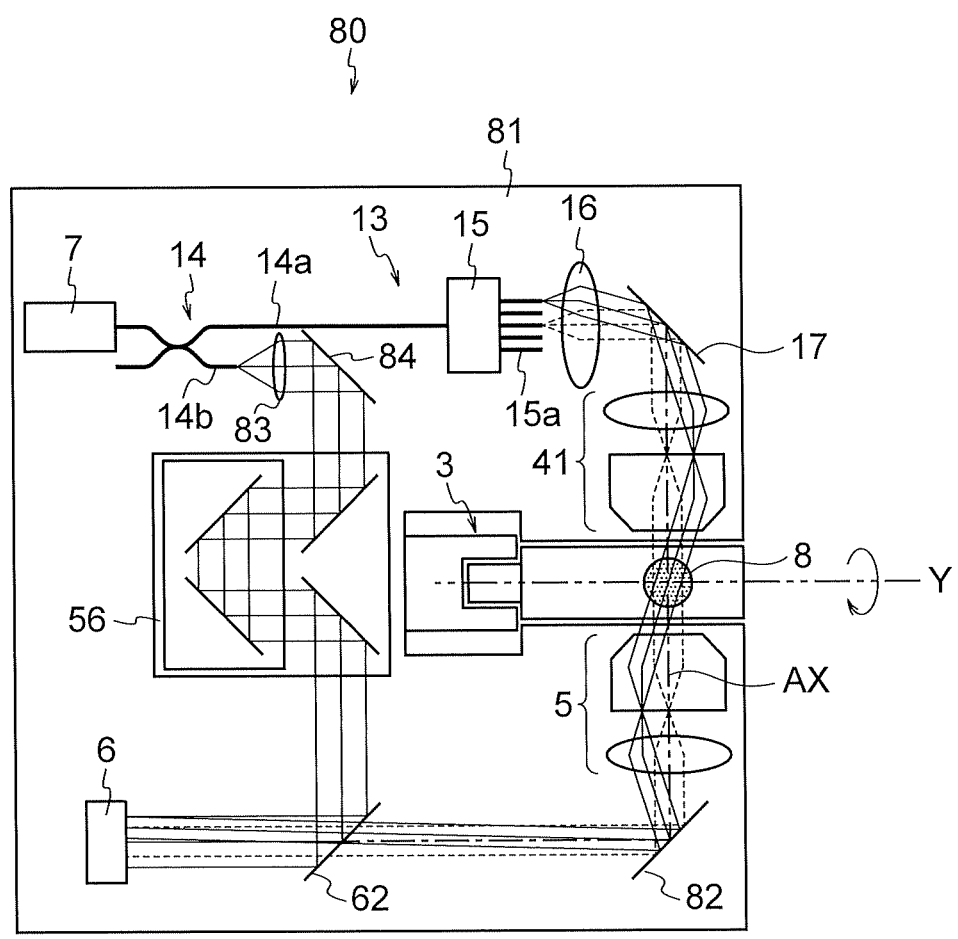
FIG. 18 is a diagram illustrating an image pickup apparatus of the present embodiment.

An image pickup apparatus of the present embodiment is illustrated in FIG. 18. The same configuration as that in FIG. 2 and FIG. 16 is denoted by the same numeral and a description thereof is omitted.

An image pickup apparatus 80 includes a signal acquisition unit 81 and the rotation unit 3. The signal acquisition unit 81 includes the illumination unit 13, the detection optical system 5, and the photodetector 6.

On the measurement optical path, the illumination unit 13, the detection optical system 5, and a mirror 82 are disposed. On the reference optical path, the optical fiber 14b, a lens 83, a mirror 84, and the optical path length adjustor 56 are disposed.

The mirror 82 is a fixed mirror. Thus, in the image pickup apparatus 80, a light ray emerged from the mirror 82 moves. Since the light flux diameter in the reference optical path is sufficiently large, it is possible to form interference fringes even when the light ray emerged from the mirror 82 moves. Furthermore, if the mirror 82 is disposed at a position conjugate to the sample 8 with the detection optical system 5 interposed therebetween, it is possible to suppress movement of a light flux on the photodetector 6.

In the image pickup apparatus 80, a light ray on the measurement optical path transmitted through the beam splitter 62 and a light ray on the reference optical path reflected by the beam splitter 62 are incident on the photodetector 6. Thus, in the image pickup apparatus 80, it is possible to obtain interference fringes. It is possible to measure a data set that enables reconstruction of a wavefront from the interference fringes detected by the photodetector 6.

In the image pickup apparatus 80, the signal acquisition unit 81 is fixed, and the sample 8 rotates around the first axis Y. Furthermore, multidirectional irradiation can be performed by changing the optical fibers 15a that light is emerged. In this way, in the image pickup apparatus 80, it is possible to isotropically acquire spatial frequency information of a sample, with a simple configuration.

Figure 19:
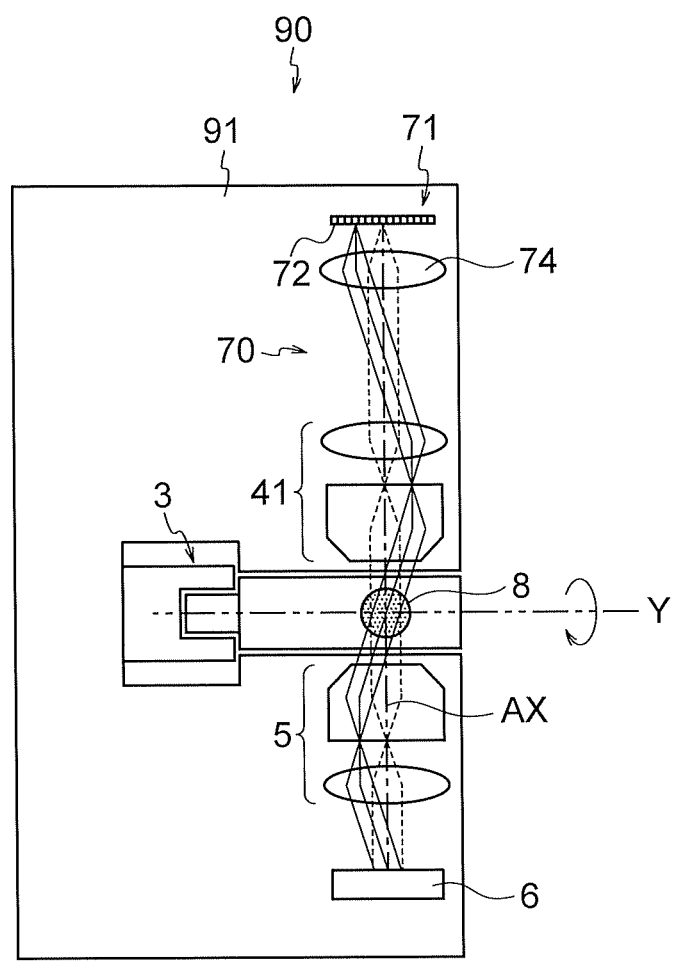
FIG. 19 is a diagram illustrating an image pickup apparatus of the present embodiment.

An image pickup apparatus of the present embodiment is illustrated in FIG. 19. The same configuration as that in FIG. 1 and FIG. 17 is denoted by the same numeral and a description thereof is omitted.

An image pickup apparatus 90 includes a signal acquisition unit 91 and the rotation unit 3. The signal acquisition unit 91 includes the illumination unit 70, the detection optical system 5, and the photodetector 6.

In the image pickup apparatus 90, since there is only one optical path, it is not possible to obtain interference fringes. Therefore, in the image pickup apparatus 90, amplitude data of a wavefront is measured. The measurement method is as described above.

In the image pickup apparatus 90, the signal acquisition unit 91 is fixed, and the sample 8 rotates around the first axis Y. Furthermore, multidirectional irradiation can be performed by changing the light-emerging portions 72 from which light is emitted. In this way, in the image pickup apparatus 90, it is possible to isotropically acquire spatial frequency information of a sample, with a simple configuration.

It is preferable that the image pickup apparatus of the present embodiment include a sample holder configured to hold the sample, and the rotation unit fix the sample holder and rotate the signal acquisition unit relative to the sample holder.

In the image pickup apparatus of the present embodiment, the rotation unit fixes the holder and rotates the signal acquisition unit relative to the holder. Since the signal acquisition unit rotates, it is unnecessary to rotate the sample. Therefore, when a sample is held in an aqueous solution, it becomes possible to conduct measurement without considering the position of the sample and the angle followability.

Figure 20:
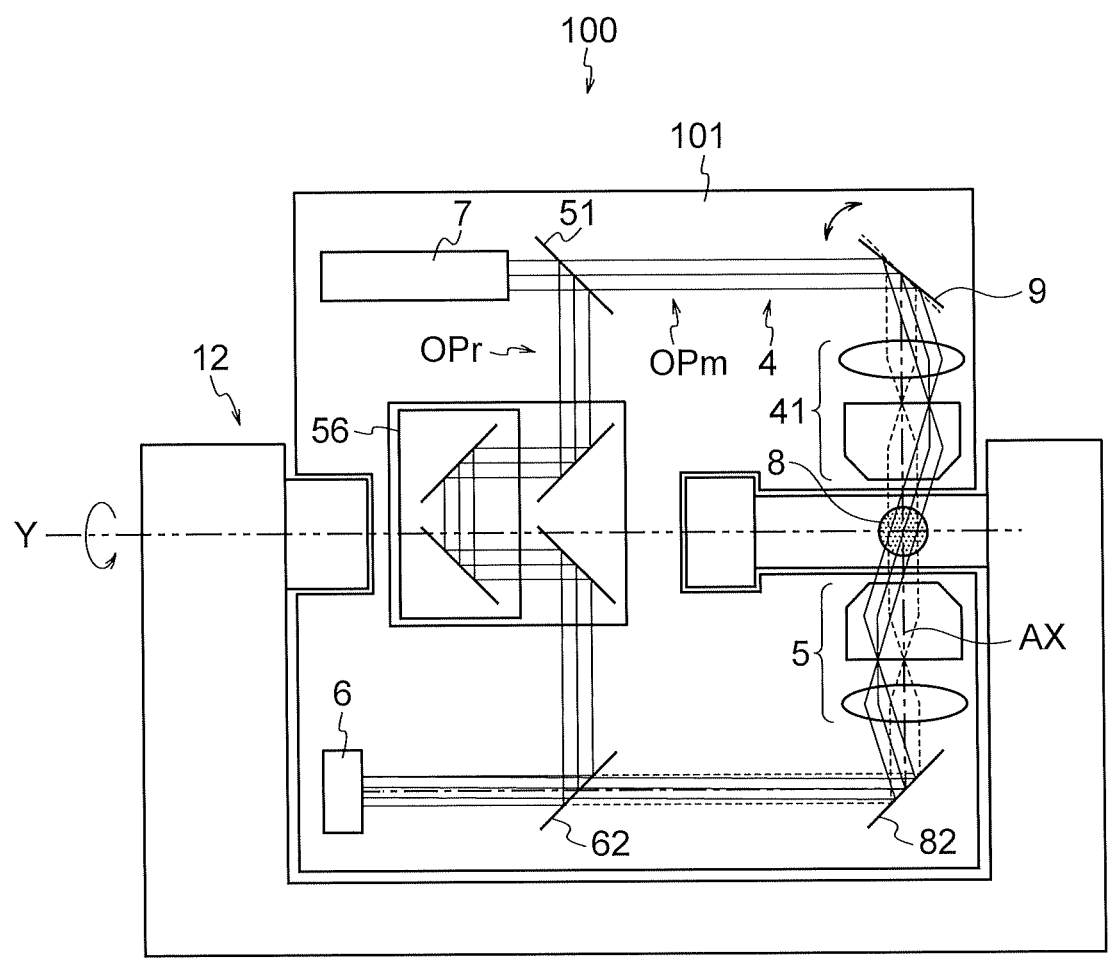
FIG. 20 is a diagram illustrating an image pickup apparatus of the present embodiment.

An image pickup apparatus of the present embodiment is illustrated in FIG. 20. The same configuration as that in FIG. 2 and FIG. 16 is denoted by the same numeral and a description thereof is omitted.

An image pickup apparatus 100 includes a signal acquisition unit 101 and the rotation unit 12. The signal acquisition unit 101 includes the illumination unit 4, the detection optical system 5, and the photodetector 6.

On the measurement optical path OPm, the illumination unit 4, the detection optical system 5, and the mirror 82 are disposed. On the reference optical path OPr, the optical path length adjustor 56 is disposed.

The mirror 82 is a fixed mirror. Thus, in the image pickup apparatus 100, a light ray emerged from the mirror 82 moves. Since the light flux diameter in the reference optical path OPr is sufficiently large, it is possible to form interference fringes even when the light ray emerged from the mirror 82 moves. Furthermore, if the mirror 82 is disposed at a position conjugate to the sample 8 with the detection optical system 5 interposed therebetween, it is possible to suppress movement of a light flux on the photodetector 6.

In the image pickup apparatus 100, a light ray on the measurement optical path OPm transmitted through the beam splitter 62 and a light ray on the reference optical path OPr reflected by the beam splitter 62 are incident on the photodetector 6. Thus, in the image pickup apparatus 100, it is possible to obtain interference fringes. It is possible to measure a data set that enables reconstruction of a wavefront from the interference fringes detected by the photodetector 6.

In the image pickup apparatus 100, the sample 8 is fixed, and the signal acquisition unit 101 rotates around the first axis Y. Furthermore, multidirectional irradiation can be performed by moving the mirror 9. In this way, in the image pickup apparatus 100, it is possible to isotropically acquire spatial frequency information of a sample, with a simple configuration.

Figure 21:
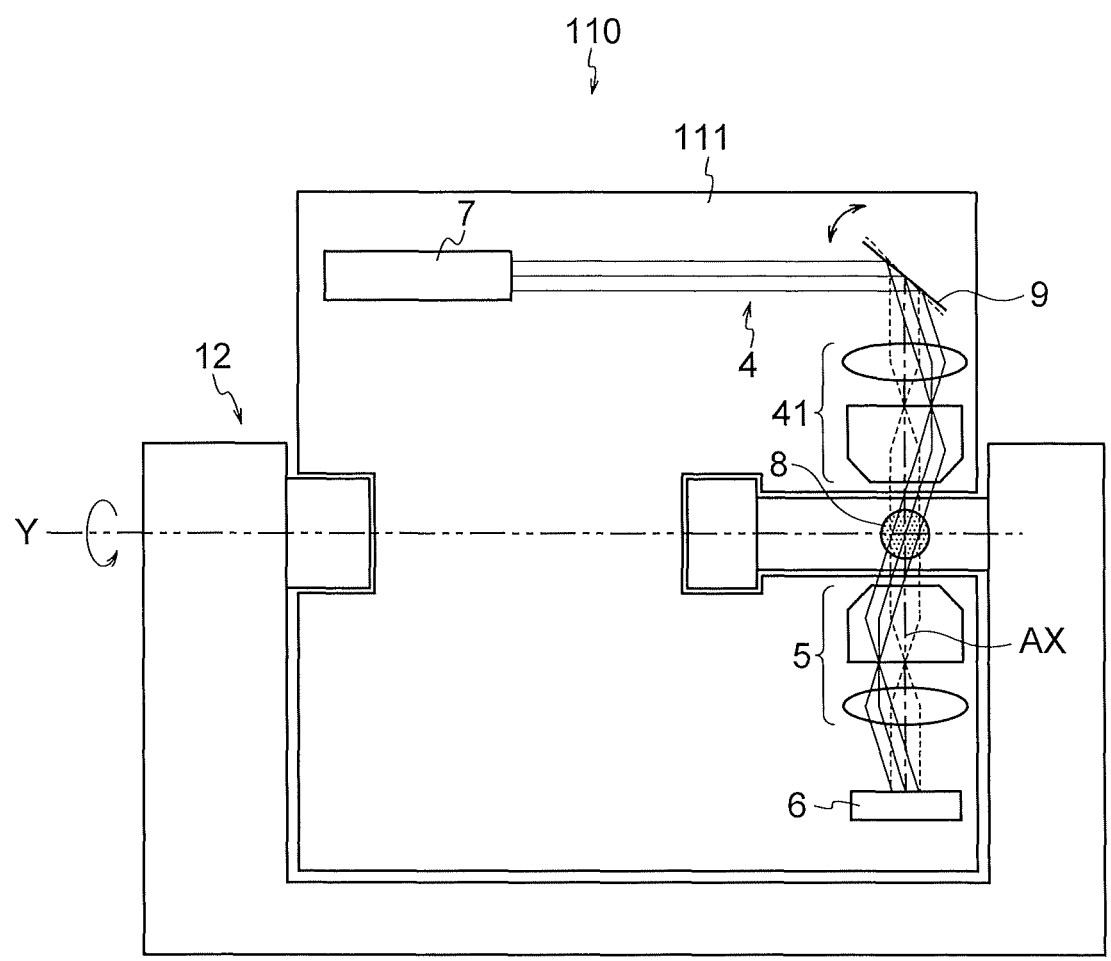
FIG. 21 is a diagram illustrating an image pickup apparatus of the present embodiment.

An image pickup apparatus of the present embodiment is illustrated in FIG. 21. The same configuration as that in FIG. 1 and FIG. 2 is denoted by the same numeral and a description thereof is omitted.

An image pickup apparatus 110 includes a signal acquisition unit 111 and the rotation unit 12. The signal acquisition unit 111 includes the illumination unit 4, the detection optical system 5, and the photodetector 6.

In the image pickup apparatus 110, since there is only one optical path, it is not possible to obtain interference fringes. Therefore, in the image pickup apparatus 110, amplitude data of a wavefront is measured. The measurement method is as described above.

In the image pickup apparatus 110, the sample 8 is fixed, and the signal acquisition unit 111 rotates around the first axis Y. Furthermore, multidirectional irradiation can be performed by moving the mirror 9. In this way, in the image pickup apparatus 110, it is possible to isotropically acquire spatial frequency information of a sample, with a simple configuration.

Figure 22:
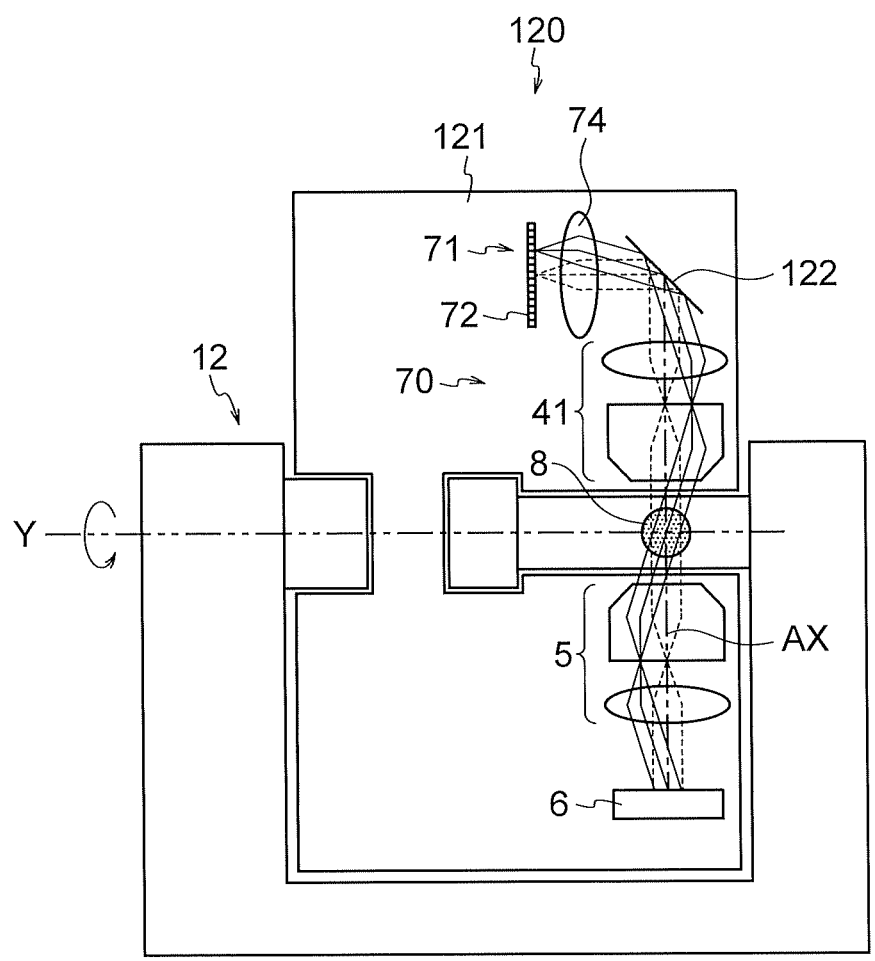
FIG. 22 is a diagram illustrating an image pickup apparatus of the present embodiment.

An image pickup apparatus of the present embodiment is illustrated in FIG. 22. The same configuration as that in FIG. 2 and FIG. 19 is denoted by the same numeral and a description thereof is omitted.

An image pickup apparatus 120 includes a signal acquisition unit 121 and the rotation unit 12. The signal acquisition unit 121 includes the illumination unit 70, the detection optical system 5, and the photodetector 6.

In the image pickup apparatus 120, since there is only one optical path, it is not possible to obtain interference fringes. Therefore, in the image pickup apparatus 120, amplitude data of a wavefront is measured. The measurement method is as described above.

In the image pickup apparatus 120, the sample 8 is fixed, and the signal acquisition unit 121 rotates around the first axis Y. Furthermore, multidirectional irradiation can be performed by changing the light-emerging portions 72 from which light is emitted. In this way, in the image pickup apparatus 120, it is possible to isotropically acquire spatial frequency information of a sample, with a simple configuration.

In the image pickup apparatuses described above, it is possible to isotropically acquire spatial frequency information of a sample. That is, it is possible to widen the acquisition range of the scattering potential. As a result, it is possible to increase the number of scattering potentials that can be acquired. With increase in number of scattering potentials, it is possible to generate an image of a sample more accurately.

In order to reduce a shape change of incident wavefronts involved with rotation, the sample holder may be shaped like a cylinder. In order to reduce a wavefront change at the time of incidence on the sample holder, a gap between the sample holder and the apparatus may be filled with a matching solution. Furthermore, an optical system that applies a wavefront change in advance to cancel a wavefront change at the time of incidence on the sample holder may be further included.

It is also possible to obtain the scattering potential in a simulation. It is possible to generate an image of a sample based on the scattering potential obtained in a simulation.

An image illustrating the acquisition range of the scattering potential is illustrated in FIG. 23A, FIG. 23B, FIG. 23C, FIG. 23D, FIG. 23E, FIG. 23F, FIG. 23G, FIG. 23H, and FIG. 23I. An image of a sample is illustrated in FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L. All the images are images obtained in a simulation.

In a simulation, a rod array is used as a sample. In the rod array, a plurality of rods are arranged at regular intervals. The diameter of one rod is 4 μm. The rod array is irradiated with light having a wavelength of 1.3 μm.

The simulation is performed in a case where unidirectional irradiation is used and a case where multidirectional irradiation is used. In unidirectional irradiation, the incident angle of light on the sample is 0°. In multidirectional irradiation, the incident angles of light on the sample are 0° and 7.5°. Furthermore, the numerical aperture of the detection optical system is 0.5. Thus, the condition for the angle is as follows.

Unidirectional irradiation: θILL=0°
Multidirectional irradiation: θILL=0°, 7.5°
NA=0.5

Figure 23A:
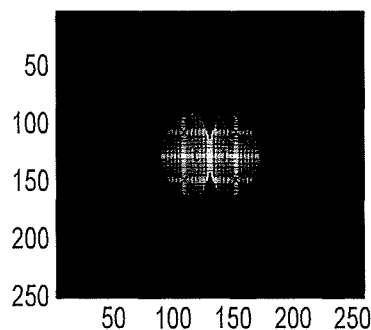
FIG. 23A, FIG. 23B, FIG. 23C, FIG. 23D, FIG. 23E, FIG. 23F, FIG. 23G, FIG. 23H, and FIG. 23I are diagrams illustrating an image illustrating an acquisition range of the scattering potential.
Figure 23D:
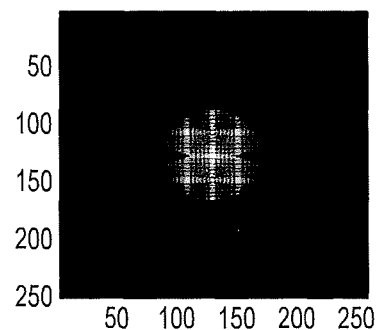
Figure 23G:
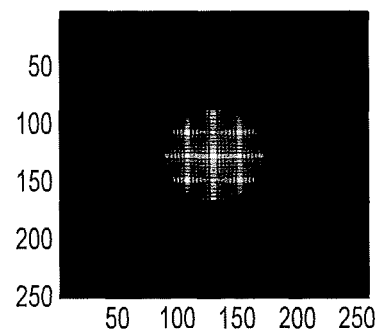
Figure 23B:
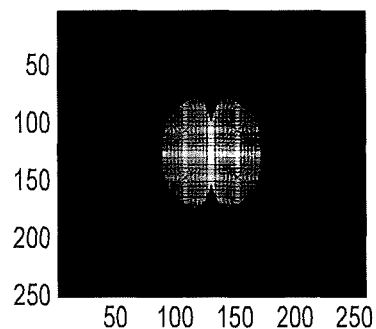
Figure 23E:
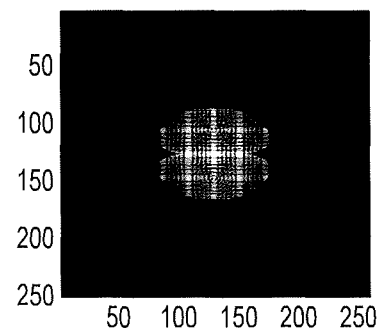
Figure 23H:
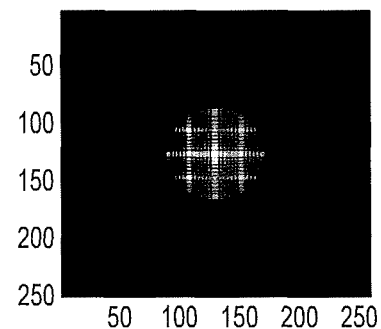
Figure 23C:
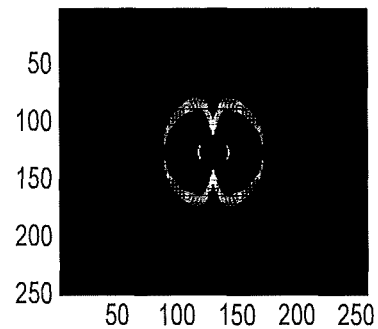
Figure 23F:
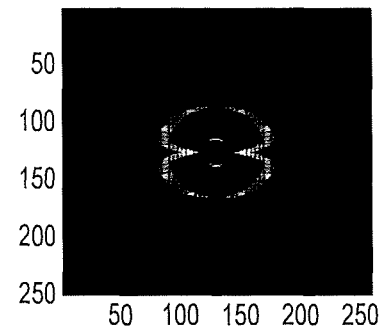

In FIG. 23A, FIG. 23B, and FIG. 23C, the acquisition range of the scattering potential in a plane including the fy axis and the fx axis is illustrated. In FIG. 23D, FIG. 23E, and FIG. 23F, the acquisition range of the scattering potential in a plane including the fz axis and the fy axis is illustrated. In FIG. 23G, FIG. 23H, and FIG. 23O, the acquisition range of the scattering potential in a plane including the fx axis and the fz axis is illustrated.

Figure 23I:
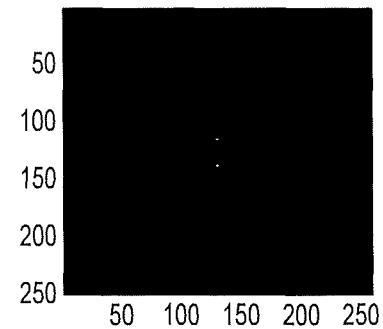
Figure 23I:
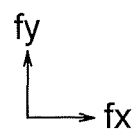
Figure 23I:
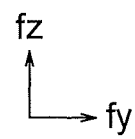
Figure 23I:
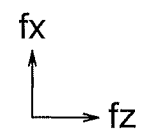

In FIG. 23A, FIG. 23D, and FIG. 23G, the acquisition range of the scattering potential in unidirectional irradiation is illustrated. In FIG. 23B, FIG. 23E, and FIG. 23H, the acquisition range of the scattering potential in multidirectional irradiation is illustrated. In FIG. 23C, FIG. 23F, and FIG. 23I, a difference is illustrated. The difference is the difference between the acquisition range of the scattering potential in unidirectional irradiation and the acquisition range of the scattering potential in multidirectional irradiation.

As can be understood from the comparison between FIG. 23A and FIG. 23B and the comparison between FIG. 23D and FIG. 23E, the acquisition range of the scattering potential in multidirectional irradiation is wider than the acquisition range of the scattering potential in unidirectional irradiation. The acquisition range of the scattering potential extends in the fy-axis direction. This is because the incident angle of measurement light on the sample is changed in a plane including the Y axis and the Z axis.

When FIG. 23G and FIG. 23H are compared, the acquisition range of the scattering potential does not change. This is because the incident angle of measurement light on the sample is not changed in a plane including the X axis and the Z axis.

In FIG. 24A, FIG. 24B, FIG. 24C, and FIG. 24D, an image of a sample in a plane including the Y axis and the X axis is illustrated. In FIG. 24E, FIG. 24F, FIG. 24G, and FIG. 24H, an image of a sample in a plane including the Z axis and the Y axis is illustrated. In FIG. 24I, FIG. 24J, FIG. 24K, and FIG. 24L, an image of a sample in a plane including the X axis and the Z axis is illustrated.

Figure 24A:
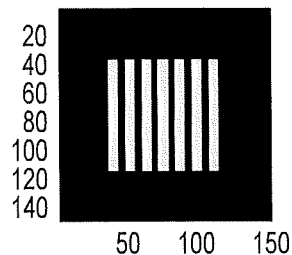
FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are diagrams illustrating an image of a sample.
Figure 24E:
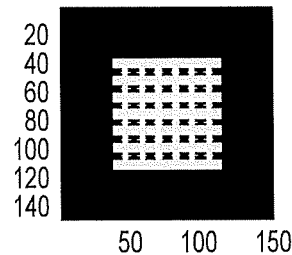
Figure 24I:
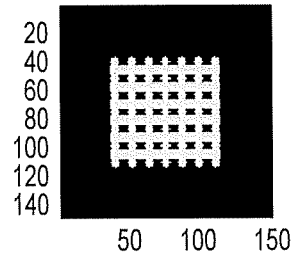
Figure 24B:
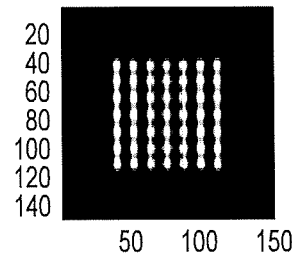
Figure 24F:
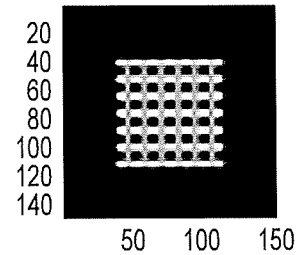
Figure 24J:
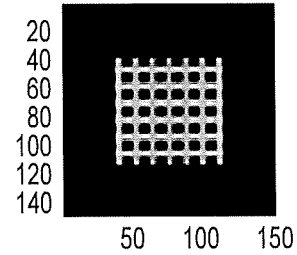
Figure 24C:
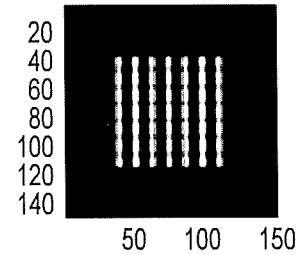
Figure 24G:
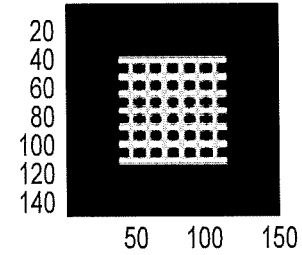
Figure 24K:
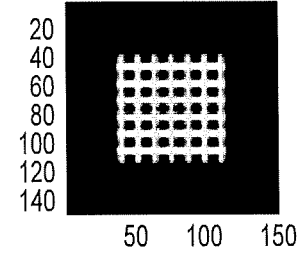
Figure 24D:
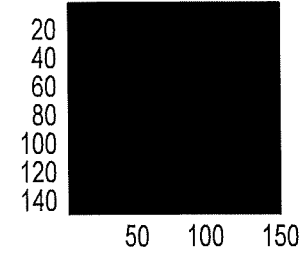
Figure 24H:
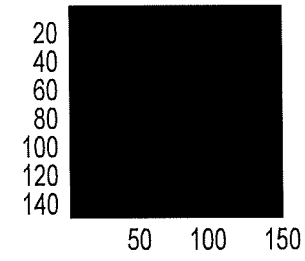
Figure 24L:
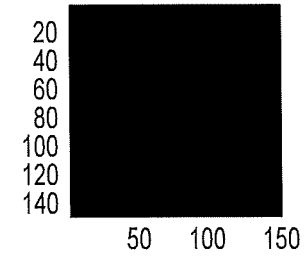
Figure 24L:
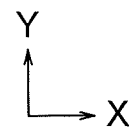
Figure 24L:
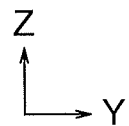
Figure 24L:
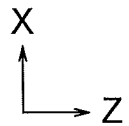

In FIG. 24A, FIG. 24E, and FIG. 24I, an input image is illustrated. In FIG. 24B, FIG. 24F, and FIG. 24J, an output image in unidirectional irradiation is illustrated. In FIG. 24C, FIG. 24G, and FIG. 24K, an output image in multidirectional irradiation is illustrated. In FIG. 24D, FIG. 24H, and FIG. 24I, a differential image is illustrated. The differential image is the difference between the output image in unidirectional irradiation and the output image in multidirectional irradiation.

As can be understood from the comparison between FIG. 24B and FIG. 24C and the comparison between FIG. 24F and FIG. 24G, the output image in multidirectional irradiation is sharper than the output image in unidirectional irradiation. The output image is sharper in the Y-axis direction. This is because the incident angle of measurement light on the sample is changed in a plane including the Y axis and the Z axis.

When FIG. 24J and FIG. 24K are compared, there is a slight difference in brightness but the sharpness does not change. This is because the incident angle of measurement light on the sample is not changed in a plane including the X axis and the Z axis.

As just described, it is understood that with increase in number of scattering potentials, it is possible to generate an image of a sample more accurately, also in a simulation.

The overview of generation of an image is described. A flat sample and a three-dimensional sample are described.

Figure 25A:
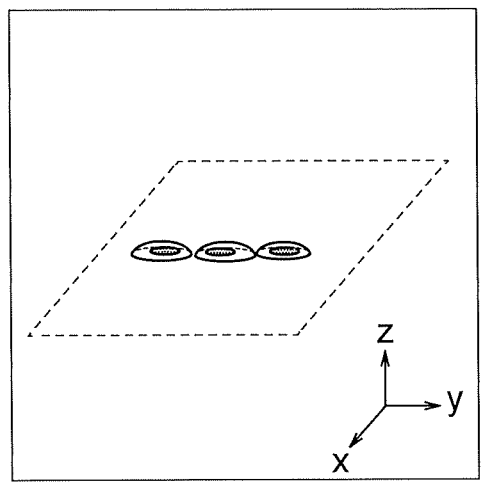
FIG. 25A, FIG. 25B, FIG. 25C, and FIG. 25D are diagrams illustrating a flat sample and a distribution of the scattering potential.
Figure 25B:
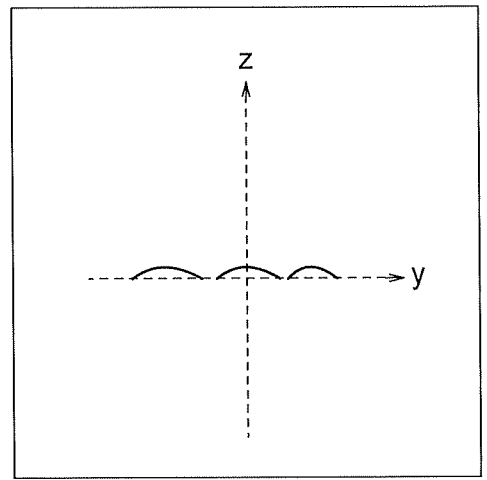
Figure 25C:
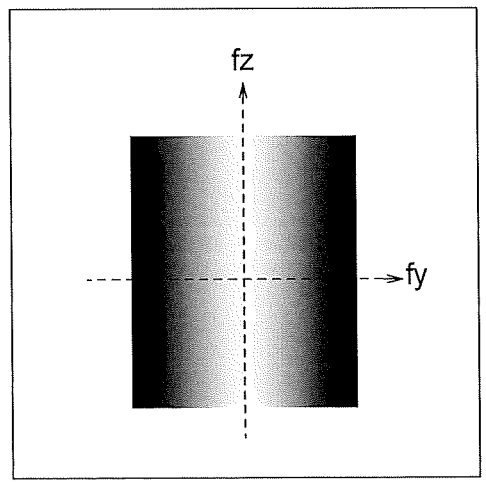
Figure 25D:
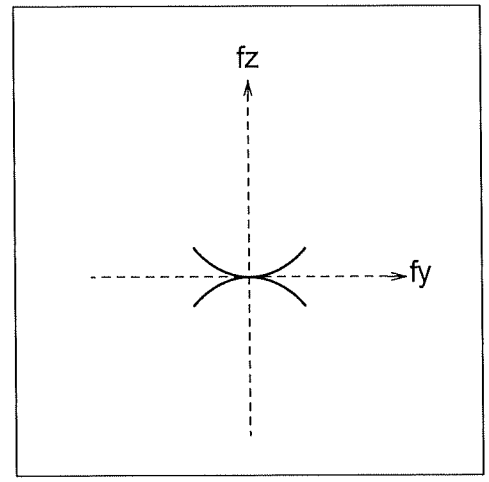

A flat sample and a distribution of the scattering potential are illustrated in FIG. 25A, FIG. 25B, FIG. 25C, and FIG. 25D. FIG. 25A is a diagram illustrating a sample, FIG. 25B is a diagram illustrating a distribution of the scattering potential in real space, FIG. 25C is a diagram illustrating a distribution of the scattering potential in frequency space, and FIG. 25D is a diagram illustrating a frequency distribution that can be acquired by an optical system.

As illustrated in FIG. 25A, in the flat sample, a plurality of transparent phase objects are distributed in the XY plane. Therefore, as illustrated in FIG. 25B, the distribution of the scattering potential in real space is also flat.

In this case, in the distribution of the scattering potential in frequency space, as illustrated in FIG. 25C, brightness varies in the fy-axis direction but brightness does not vary in the fz-axis direction.

The variation in brightness means that frequencies of different values exist. Thus, it follows that frequencies of different values exist in the fy-axis direction but only a frequency of one value exists in the fz-axis direction.

In frequency space, the scattering potential is distributed as illustrated in FIG. 25C. In acquisition of the scattering potential, it is preferable that all the scattering potential be acquired. However, as illustrated in FIG. 25D, the frequency that can be acquired by the optical system is limited. The distribution illustrated in FIG. 25D is a frequency distribution in unidirectional irradiation.

In this case, a frequency distribution $C_{2D}$ of the acquired scattering potential is given by the following Expression (1):

$$C_{2D} = A_{2D} \times B \quad (1)$$

where $A_{2D}$ is a distribution of the scattering potential in frequency space, and B is a frequency distribution that can be acquired by the optical system.

Furthermore, a spatial distribution $D_{2D}$ of the acquired scattering potential is given by the following Expression (2):

$$D_{2D} = FFT(C_{2D}) \quad (2)$$

where FFT( ) is a Fourier transform.

In a flat sample, as illustrated in FIG. 25A, there is little thickness in the Z-axis direction. Therefore, when an image of a flat sample is to be generated, it is only necessary to acquire an image of $D_{2D}$ (x,y,z=0). Thus, even if no scattering potential is obtained in the fz-axis direction, this does not hinder generation of an image.

As illustrated in FIG. 25C, the brightness varies in the fy-axis direction. Furthermore, as illustrated in FIG. 25D, a curve exists in the fy-axis direction. Thus, the scattering potential can be obtained in the fy-axis direction. As a result, even for a transparent phase object, it is possible to obtain an image of $D_{2D}$ (x,y,z=0), that is, an image of a flat sample.

In the image pickup apparatus of the present embodiment, it is possible to rotate the sample and the signal acquisition unit relative to each other. Thus, the scattering potential can be obtained in the fz-axis direction. However, since it does not matter if no scattering potential is obtained in the fz-axis direction, rotation is not necessarily performed.

In the image pickup apparatus of the present embodiment, illumination by multidirectional irradiation is possible. Thus, even for a transparent phase object, it is possible to obtain an image of a flat sample more accurately.

Figure 26A:
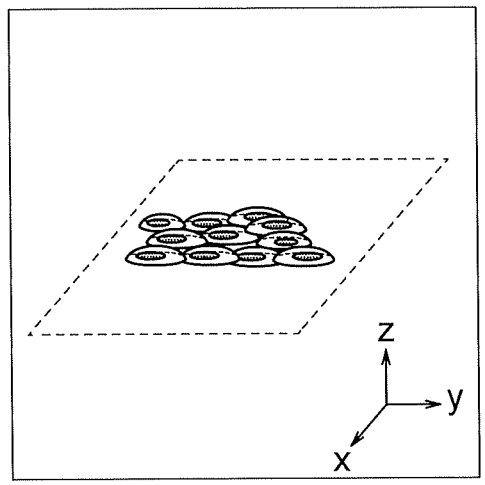
FIG. 26A, FIG. 26B, FIG. 26C, and FIG. 26D are diagrams illustrating a three-dimensional sample and a distribution of the scattering potential.
Figure 26B:
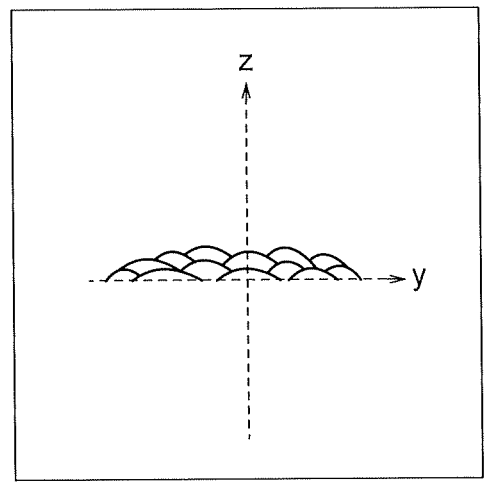
Figure 26C:
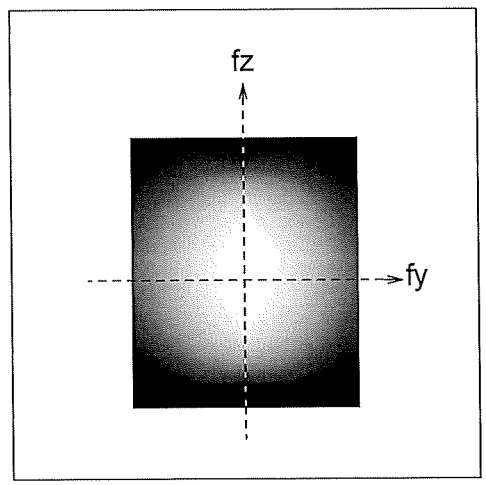
Figure 26D:
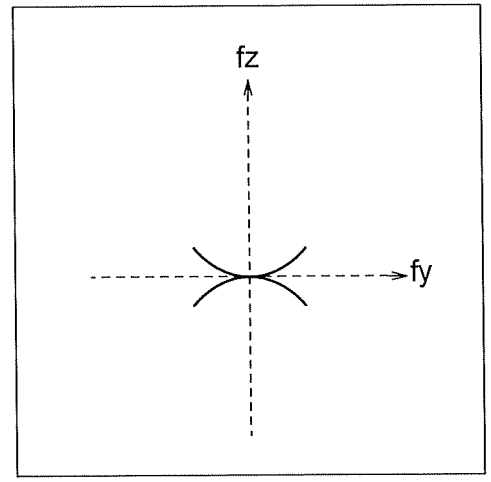

A three-dimensional sample and a distribution of the scattering potential are illustrated in FIG. 26A, FIG. 26B, FIG. 26C, and FIG. 26D. FIG. 26A is a diagram illustrating a sample, FIG. 26B is a diagram illustrating a distribution of the scattering potential in real space, FIG. 26C is a diagram illustrating a distribution of the scattering potential in frequency space, and FIG. 26D is a diagram illustrating a frequency distribution that can be acquired by an optical system.

As illustrated in FIG. 26A, in a three-dimensional sample, a plurality of transparent phase objects are distributed not only in the XY plane but also distributed in the Z direction. Therefore, as illustrated in FIG. 26B, a distribution of the scattering potential in real space is also three-dimensional.

In this case, in a distribution of the scattering potential in frequency space, as illustrated in FIG. 26C, the brightness varies not only in the fy-axis direction but also in the fz-axis direction.

As described above, the variation in brightness means that frequencies of different values exist. Thus, it follows that frequencies of different values exist not only in the fy-axis direction but also in the fz-axis direction.

In frequency space, the scattering potential is distributed as illustrated in FIG. 26C. In acquisition of the scattering potential, it is preferable that all the scattering potential be acquired. However, as illustrated in FIG. 26D, the frequency that can be acquired by the optical system is limited. The distribution illustrated in FIG. 26D is a frequency distribution in unidirectional irradiation.

In this case, a frequency distribution $C_{3D}$ of the acquired scattering potential is given by the following Expression (3):

$$C_{3D} = A_{3D} \times B \quad (3)$$

where $A_{3D}$ is a distribution of the scattering potential in frequency space, and B is a frequency distribution that can be acquired by the optical system.

Furthermore, a spatial distribution $D_{3D}$ of the acquired scattering potential is given by the following Expression (4):

$$D_{3D} = FFT(C_{3D}) \quad (4)$$

where FFT( ) is a Fourier transform.

As described above, in a three-dimensional sample, as illustrated in FIG. 26C, the brightness varies even in the fz-axis direction. Thus, the scattering potential has a distribution not uniform for the spatial frequency even in the fz-axis direction.

In a three-dimensional sample, as illustrated in FIG. 26A, there is a thickness in the Z-axis direction. Therefore, when an image of a three-dimensional sample is to be generated, it is necessary to obtain not only an image of $D_{3D}$ (x,y,z=0) but also an image of $D_{3D}$ (x,y,z≠0). Thus, if no scattering potential is obtained in the fz-axis direction, this hinders generation of an image.

As illustrated in FIG. 26C, since the brightness varies in the fy-axis direction and the fz-axis direction, it is preferable that the scattering potential can be acquired in the fz-axis direction and the fz-axis direction.

As illustrated in FIG. 26D, a curve exists in the fy-axis direction. Thus, the scattering potential can be obtained in the fy-axis direction. Furthermore, in the image pickup apparatus of the present embodiment, it is possible to rotate the sample and the signal acquisition unit relative to each other. Thus, the scattering potential can be obtained even in the fz-axis direction. As a result, even for a transparent phase object, it is possible to obtain an image of $D_{3D}(x,y,z=0)$ and an image of $D_{3D}(x,y,z\neq 0)$, that is, an image of a three-dimensional sample.

In addition, in the image pickup apparatus of the present embodiment, illumination by multidirectional irradiation is possible. Thus, even for a transparent phase object, it is possible to obtain an image of a three-dimensional sample more accurately.

According to the present disclosure, it is possible to provide an image pickup apparatus capable of isotropically acquiring spatial frequency information of a sample, with a simple configuration.

As described above, the present disclosure is suitable for an image pickup apparatus capable of isotropically acquiring spatial frequency information of a sample, with a simple configuration.

What is claimed is:

1. An image pickup apparatus comprising:
a signal acquisition unit and a rotation unit,
wherein the signal acquisition unit includes an illumination unit including a light source and configured to irradiate a sample with a parallel light beam, a photodetector including a plurality of light-receiving portions two-dimensionally arranged, and a detection optical system configured to guide light having been irradiated from the illumination unit to the sample and passed through the sample, to the photodetector,
the rotation unit rotates the sample and the signal acquisition unit relative to each other, about a first axis intersecting an optical axis of the detection optical system in the sample,
the illumination unit irradiates the sample with parallel light beams at two or more incident angles, for each of different rotation states between the sample and the signal acquisition unit, in a plane including the optical axis and the first axis,
the illumination unit does not simultaneously irradiate the respective parallel light beams at two or more different incident angles which irradiate the sample, and
the photodetector detects light corresponding to each of the parallel light beams at two or more different incident angles which irradiate the sample, for each of different rotation states between the sample and the signal acquisition unit;
wherein the incident angle is an angle formed between a central ray of a parallel light beam to illuminate the sample and the optical axis of the detection optical system, and
the illumination unit changes the incident angle to an angle that satisfies the following Conditional Expression (1):

$$0 < n \sin \theta ILL < NA \qquad (1)$$

where NA is an optical numerical aperture of the detection optical system,
θILL is the incident angle, and
n is a refractive index of a medium.

2. An image pickup apparatus comprising:
a signal acquisition unit and a rotation unit,
wherein the signal acquisition unit includes an illumination unit including a light source and configured to irradiate a sample with a parallel light beam, a photodetector including a plurality of light-receiving portions two-dimensionally arranged, and a detection optical system configured to guide light having been irradiated from the illumination unit to the sample and passed through the sample, to the photodetector,
the rotation unit rotates the sample and the signal acquisition unit relative to each other, about a first axis intersecting an optical axis of the detection optical system in the sample,
the illumination unit irradiates the sample with parallel light beams at two or more incident angles, for each of different rotation states between the sample and the signal acquisition unit, in a plane including the optical axis and the first axis,
the illumination unit does not simultaneously irradiate the respective parallel light beams at two or more different incident angles which irradiate the sample, and
the photodetector detects light corresponding to each of the parallel light beams at two or more different incident angles which irradiate the sample, for each of different rotation states between the sample and the signal acquisition unit;
wherein the incident angle is an angle formed between a central ray of a parallel light beam to illuminate the sample and the optical axis of the detection optical system, and
the illumination unit changes the incident angle to an angle that satisfies the following Conditional Expression (1'):

$$0.13 \times NA < n \sin \theta ILL < 0.7 \times NA \qquad (1')$$

where NA is an optical numerical aperture of the detection optical system,
θILL is the incident angle, and
n is a refractive index of a medium.

3. The image pickup apparatus according to claim 1, wherein the illumination unit includes:
an illumination optical system configured to irradiate the sample with a parallel light beam and
a first optical deflection element disposed at a position conjugate to an intersection of the optical axis and the first axis, and
the incident angle is changed to two or more angles by the first optical deflection element.

4. The image pickup apparatus according to claim 3, further comprising a first beam splitter, a second optical deflection element, and a second beam splitter,
wherein a measurement optical path passing through the sample and a reference optical path are positioned between the light source and the photodetector,
the first beam splitter and the second beam splitter each have an optical surface having an optical film,
in the first beam splitter, light transmitted in a first direction and light reflected in a second direction are generated from incident light by the optical film,
the measurement optical path is positioned in the first direction and the reference optical path is positioned in the second direction, or the reference optical path is positioned in the first direction and the measurement optical path is positioned in the second direction, the first optical deflection element is disposed on the measurement optical path, the second optical deflection element is disposed on the reference optical path, an incident light is deflected and emerged, the second beam splitter is disposed at an intersection of the measurement optical path deflected by the first optical deflection element and the reference optical path deflected by the second optical deflection element, and a light ray on the measurement optical path reflected by the second beam splitter and a light ray on the reference optical path transmitted through the second beam splitter are incident on the photodetector.

5. The image pickup apparatus according to claim 1, wherein the illumination unit includes an illumination optical system configured to irradiate the sample with a parallel light beam, the illumination unit includes a plurality of light-emerging portions arranged in an array and capable of being independently controlled, the light-emerging portions are disposed at a position conjugate to a pupil position of the illumination optical system, and the illumination unit changes the incident angle to two or more angles by performing control of changing the light-emerging portion from which light is emerged among the light-emerging portions.

6. The image pickup apparatus according to claim 1, further comprising a sample holder configured to hold the sample, wherein the rotation unit fixes the signal acquisition unit and rotates the sample holder relative to the signal acquisition unit.

7. The image pickup apparatus according to claim 1, further comprising a sample holder configured to hold the sample, wherein the rotation unit fixes the sample holder and rotates the signal acquisition unit relative to the sample holder.

8. The image pickup apparatus according to claim 2, wherein the illumination unit includes:

an illumination optical system configured to irradiate the sample with a parallel light beam and a first optical deflection element disposed at a position conjugate to an intersection of the optical axis and the first axis, and the incident angle is changed to two or more angles by the first optical deflection element.

9. The image pickup apparatus according to claim 8, further comprising a first beam splitter, a second optical deflection element, and a second beam splitter, wherein a measurement optical path passing through the sample and a reference optical path are positioned between the light source and the photodetector, the first beam splitter and the second beam splitter each have an optical surface having an optical film, in the first beam splitter, light transmitted in a first direction and light reflected in a second direction are generated from incident light by the optical film, the measurement optical path is positioned in the first direction and the reference optical path is positioned in the second direction, or the reference optical path is positioned in the first direction and the measurement optical path is positioned in the second direction, the first optical deflection element is disposed on the measurement optical path, the second optical deflection element is disposed on the reference optical path, an incident light is deflected and emerged, the second beam splitter is disposed at an intersection of the measurement optical path deflected by the first optical deflection element and the reference optical path deflected by the second optical deflection element, and a light ray on the measurement optical path reflected by the second beam splitter and a light ray on the reference optical path transmitted through the second beam splitter are incident on the photodetector.

10. The image pickup apparatus according to claim 2, wherein the illumination unit includes an illumination optical system configured to irradiate the sample with a parallel light beam, the illumination unit includes a plurality of light-emerging portions arranged in an array and capable of being independently controlled, the light-emerging portions are disposed at a position conjugate to a pupil position of the illumination optical system, and the illumination unit changes the incident angle to two or more angles by performing control of changing the light-emerging portion from which light is emerged among the light-emerging portions.

11. The image pickup apparatus according to claim 2, further comprising a sample holder configured to hold the sample, wherein the rotation unit fixes the signal acquisition unit and rotates the sample holder relative to the signal acquisition unit.

12. The image pickup apparatus according to claim 2, further comprising a sample holder configured to hold the sample, wherein the rotation unit fixes the sample holder and rotates the signal acquisition unit relative to the sample holder.

13. An image pickup apparatus comprising:

a signal acquisition unit and a rotation unit, wherein the signal acquisition unit includes an illumination unit including a light source and configured to irradiate a sample with a parallel light beam, a photodetector including a plurality of light-receiving portions two-dimensionally arranged, and a detection optical system configured to guide light having been irradiated from the illumination unit to the sample and passed through the sample, to the photodetector, the rotation unit rotates the sample and the signal acquisition unit relative to each other, about a first axis intersecting an optical axis of the detection optical system in the sample, the illumination unit irradiates the sample with parallel light beams at two or more incident angles, for each of different rotation states between the sample and the signal acquisition unit, in a plane including the optical axis and the first axis, the illumination unit does not simultaneously irradiate the respective parallel light beams at two or more different incident angles which irradiate the sample, and the photodetector detects light corresponding to each of the parallel light beams at two or more different incident angles which irradiate the sample, for each of different rotation states between the sample and the signal acquisition unit;

wherein the illumination unit includes:

an illumination optical system configured to irradiate the sample with a parallel light beam and a first optical deflection element disposed at a position conjugate to an intersection of the optical axis and the first axis, and the incident angle is changed to two or more angles by the first optical deflection element.

14. The image pickup apparatus according to claim 13, further comprising a first beam splitter, a second optical deflection element, and a second beam splitter, wherein a measurement optical path passing through the sample and a reference optical path are positioned between the light source and the photodetector, the first beam splitter and the second beam splitter each have an optical surface having an optical film, in the first beam splitter, light transmitted in a first direction and light reflected in a second direction are generated from incident light by the optical film, the measurement optical path is positioned in the first direction and the reference optical path is positioned in the second direction, or the reference optical path is positioned in the first direction and the measurement optical path is positioned in the second direction, the first optical deflection element is disposed on the measurement optical path, the second optical deflection element is disposed on the reference optical path, an incident light is deflected and emerged, the second beam splitter is disposed at an intersection of the measurement optical path deflected by the first optical deflection element and the reference optical path deflected by the second optical deflection element, and a light ray on the measurement optical path reflected by the second beam splitter and a light ray on the reference optical path transmitted through the second beam splitter are incident on the photodetector.

15. The image pickup apparatus according to claim 13, further comprising a sample holder configured to hold the sample, wherein the rotation unit fixes the signal acquisition unit and rotates the sample holder relative to the signal acquisition unit.

16. The image pickup apparatus according to claim 13, further comprising a sample holder configured to hold the sample, wherein the rotation unit fixes the sample holder and rotates the signal acquisition unit relative to the sample holder.

17. An image pickup apparatus comprising:

a signal acquisition unit and a rotation unit, wherein the signal acquisition unit includes an illumination unit including a light source and configured to irradiate a sample with a parallel light beam, a photodetector including a plurality of light-receiving portions two-dimensionally arranged, and a detection optical system configured to guide light having been irradiated from the illumination unit to the sample and passed through the sample, to the photodetector, the rotation unit rotates the sample and the signal acquisition unit relative to each other, about a first axis intersecting an optical axis of the detection optical system in the sample, the illumination unit irradiates the sample with parallel light beams at two or more incident angles, for each of different rotation states between the sample and the signal acquisition unit, in a plane including the optical axis and the first axis, the illumination unit does not simultaneously irradiate the respective parallel light beams at two or more different incident angles which irradiate the sample, and the photodetector detects light corresponding to each of the parallel light beams at two or more different incident angles which irradiate the sample, for each of different rotation states between the sample and the signal acquisition unit;

wherein the illumination unit includes an illumination optical system configured to irradiate the sample with a parallel light beam, the illumination unit includes a plurality of light-emerging portions arranged in an array and capable of being independently controlled, the light-emerging portions are disposed at a position conjugate to a pupil position of the illumination optical system, and the illumination unit changes the incident angle to two or more angles by performing control of changing the light-emerging portion from which light is emerged among the light-emerging portions.

18. The image pickup apparatus according to claim 17, further comprising a sample holder configured to hold the sample, wherein the rotation unit fixes the signal acquisition unit and rotates the sample holder relative to the signal acquisition unit.

19. The image pickup apparatus according to claim 17, further comprising a sample holder configured to hold the sample, wherein the rotation unit fixes the sample holder and rotates the signal acquisition unit relative to the sample holder.

* * * * *